(12) United States Patent
Beser

(10) Patent No.: US 9,088,929 B2
(45) Date of Patent: Jul. 21, 2015

(54) SYSTEMS AND METHODS FOR DISTRIBUTED DATA ROUTING IN A WIRELESS NETWORK

(75) Inventor: Nurettin Burcak Beser, Palo Alto, CA (US)

(73) Assignee: Telsima Corporation, Santa Clara, CA (US)

(*) Notice: Subject to any disclaimer, the term of this patent is extended or adjusted under 35 U.S.C. 154(b) by 44 days.

(21) Appl. No.: 13/249,199

(22) Filed: Sep. 29, 2011

(65) Prior Publication Data

US 2012/0224474 A1 Sep. 6, 2012

Related U.S. Application Data

(63) Continuation-in-part of application No. 12/466,998, filed on May 15, 2009, now Pat. No. 8,787,250.

(60) Provisional application No. 61/053,611, filed on May 15, 2008, provisional application No. 61/387,961, filed on Sep. 29, 2010.

(51) Int. Cl.
*H04W 40/02* (2009.01)
*H04W 40/12* (2009.01)
*H04L 12/729* (2013.01)
(Continued)

(52) U.S. Cl.
CPC ............ *H04W 40/02* (2013.01); *H04L 45/125* (2013.01); *H04W 40/12* (2013.01); *H04L 12/4633* (2013.01); *H04L 12/4641* (2013.01); *H04L 45/22* (2013.01); *H04L 45/42* (2013.01); *H04W 40/04* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 5,488,608 | A | 1/1996 | Flammer, III |
| 6,259,699 | B1 | 7/2001 | Opalka et al. |

(Continued)

FOREIGN PATENT DOCUMENTS

| | | |
|---|---|---|
| CN | 1987798 | 6/2007 |
| EP | 1793542 | 6/2007 |

(Continued)

OTHER PUBLICATIONS

European Patent Application No. 09755744.1, Search Report mailed Feb. 6, 2013.

(Continued)

*Primary Examiner* — Jutai Kao
(74) *Attorney, Agent, or Firm* — Sheppard, Mullin, Richter & Hampton LLP

(57) ABSTRACT

Various systems and methods described herein relate to distributed data routing over a wireless network. An exemplary method comprises receiving routing data by a routing element of a point to point wireless network, the routing data comprising routing criteria and a plurality of path identifiers which identify a plurality of paths through the wireless network, storing the routing data by the routing element, receiving a packet of data, determining a destination node of the packet of data, the destination node being identified using the routing data as accessible by two or more paths of the plurality of paths, determining, based on the routing criteria of the routing data, at least one path of the plurality of paths to transmit the packet of data to reach the destination node, and transmitting the packet of data to a first node of the determined at least one path of the wireless network.

29 Claims, 15 Drawing Sheets

(51) Int. Cl.
| | |
|---|---|
| H04L 12/707 | (2013.01) |
| H04L 12/717 | (2013.01) |
| H04W 88/08 | (2009.01) |
| H04L 12/46 | (2006.01) |
| H04W 40/04 | (2009.01) |

(56) References Cited

U.S. PATENT DOCUMENTS

| | | | |
|---|---|---|---|
| 6,600,744 | B1 | 7/2003 | Carr et al. |
| 6,754,188 | B1 | 6/2004 | Garahi et al. |
| 6,760,766 | B1 | 7/2004 | Sahlqvist |
| 6,763,018 | B1 | 7/2004 | Puthiyandyil et al. |
| 7,120,152 | B2 | 10/2006 | Park |
| 7,317,731 | B2 | 1/2008 | Seddigh et al. |
| 7,318,179 | B1 | 1/2008 | Fernandes |
| 7,349,979 | B1 | 3/2008 | Cieslak et al. |
| 7,467,229 | B1 | 12/2008 | Biggs et al. |
| 7,684,794 | B1 | 3/2010 | Leung et al. |
| 7,694,012 | B1 | 4/2010 | Harper et al. |
| 7,707,305 | B2 | 4/2010 | Afek et al. |
| 7,783,779 | B1 | 8/2010 | Scales et al. |
| 7,802,010 | B1 | 9/2010 | Oehrke |
| 7,912,981 | B2 | 3/2011 | May et al. |
| 7,996,460 | B1 | 8/2011 | Arsenault |
| 8,020,200 | B1 | 9/2011 | Krohn et al. |
| 8,139,588 | B2 | 3/2012 | Hardjono et al. |
| 2002/0103921 | A1 | 8/2002 | Nair et al. |
| 2004/0156345 | A1* | 8/2004 | Steer et al. ............. 370/338 |
| 2004/0264379 | A1 | 12/2004 | Srikrishna et al. |
| 2005/0076231 | A1 | 4/2005 | Ichinohe et al. |
| 2005/0094620 | A1* | 5/2005 | Calcev ............. 370/351 |
| 2006/0120342 | A1 | 6/2006 | Christensen et al. |
| 2006/0203719 | A1* | 9/2006 | Kim et al. ............. 370/227 |
| 2007/0019642 | A1 | 1/2007 | Lu et al. |
| 2007/0058638 | A1* | 3/2007 | Guichard et al. ........ 370/395.31 |
| 2007/0156919 | A1 | 7/2007 | Potti et al. |
| 2007/0189158 | A1 | 8/2007 | Kulmala et al. |
| 2007/0189191 | A1* | 8/2007 | Ades ............. 370/254 |
| 2007/0207806 | A1 | 9/2007 | Shaheen |
| 2007/0263554 | A1 | 11/2007 | Finn |
| 2007/0291686 | A1 | 12/2007 | Fiat |
| 2008/0107060 | A1 | 5/2008 | Andou et al. |
| 2008/0144513 | A1* | 6/2008 | Small et al. ............. 370/238 |
| 2008/0151917 | A1* | 6/2008 | Bartlett et al. ............. 370/401 |
| 2008/0232272 | A1 | 9/2008 | Gelbman et al. |
| 2008/0259555 | A1 | 10/2008 | Bechtolsheim et al. |
| 2008/0259889 | A1 | 10/2008 | Wu |
| 2009/0219850 | A1 | 9/2009 | Lin et al. |
| 2009/0262642 | A1 | 10/2009 | Van Greunen et al. |
| 2009/0304007 | A1 | 12/2009 | Tanaka et al. |
| 2009/0310582 | A1 | 12/2009 | Beser |
| 2010/0020753 | A1* | 1/2010 | Fulknier et al. ............. 370/329 |
| 2010/0049969 | A1 | 2/2010 | Shon |
| 2010/0067462 | A1 | 3/2010 | Beser et al. |
| 2010/0098094 | A1 | 4/2010 | Jounay et al. |
| 2010/0149988 | A1 | 6/2010 | Matsubara et al. |
| 2010/0228961 | A1 | 9/2010 | Burns et al. |
| 2010/0302989 | A1 | 12/2010 | Sung et al. |
| 2011/0103279 | A1 | 5/2011 | Srinivasan et al. |
| 2012/0207116 | A1* | 8/2012 | Chen et al. ............. 370/329 |
| 2012/0290699 | A1 | 11/2012 | Zhang et al. |

FOREIGN PATENT DOCUMENTS

| | | |
|---|---|---|
| EP | 1921794 | 5/2008 |
| WO | 0023898 | 4/2000 |
| WO | 2007133786 | 11/2007 |

OTHER PUBLICATIONS

Makelainen, Antti, "Analysis of Handoff Performance in Mobile WiMax Networks," Thesis for Master of Science in Engineering, Helsinki University of Technology, Dec. 3, 2007 [Retrieved from <URL:http://lib.tkk.fi/Dipl/2007/urn010154.pdf].

International Application No. PCT/US2009/045526, International Search Report and Written Opinion mailed Jul. 24, 2009.

International Application No. PCT/US2009/044191, International Search Report and Written Opinion mailed Jul. 7, 2009.

International Application No. PCT/US2010/034810, International Search Report and Written Opinion mailed Jul. 8, 2010.

International Application No. PCT/US2011/053969, International Search Report and Written Opinion mailed Jan. 20, 2012.

European Patent Application No. 09747706.1, Search Report mailed Sep. 9, 2013.

European Patent Application No. 10775571.2, Search Report mailed Sep. 11, 2013.

European Patent Application No. 11833109.9, Partial Search Report mailed Feb. 16, 2015.

* cited by examiner

SYSTEMS AND METHODS FOR DISTRIBUTED DATA ROUTING IN A WIRELESS NETWORK

CROSS-REFERENCE TO RELATED APPLICATION

The present application is a continuation-in-part of U.S. nonprovisional patent application Ser. No. 12/466,998, filed May 15, 2009 now U.S. Pat. No. 8,787,250, and entitled "Systems and Methods for distributed Data Routing in a Wireless Network," which claims benefit of U.S. Provisional Patent Application No. 61/053,611 filed May 15, 2008, and entitled "ASN and CSN Architecture," both of which are incorporated by reference herein. This application also seeks priority to U.S. provisional patent application No. 61/387,961, filed Sep. 29, 2010, entitled "Intelligent Backhaul Management" which is also incorporated by reference herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present invention relates generally to data routing. More particularly, the invention relates to systems and methods for distributed data routing in a wireless network.

2. Description of Related Art

WiMax (Worldwide Interoperability for Microwave Access) is a wireless broadband technology, which supports point to multi-point (PMP) broadband wireless access. WiMAX™ is based upon the IEEE 802.16 standard enabling the delivery of wireless broadband services. WiMAX products can accommodate fixed and mobile usage models. The IEEE 802.16 standard was developed to deliver non-line-of-sight (LoS) connectivity between a subscriber station and base station with typical cell radius of three to ten kilometers.

All base stations and subscriber stations claiming to be WiMAX compliant must go through a rigorous WiMAX Forum Certified™ testing process. WiMAX Forum Certified systems can be expected to deliver capacity of up to 40 Mbps per channel. This is enough bandwidth to simultaneously support hundreds of businesses with T-1 speed connectivity and thousands of residences with DSL speed connectivity. The WiMAX Forum expects mobile network deployments to provide up to 15 Mbps of capacity within a typical cell radius of up to three kilometers. WiMAX technology already has been incorporated in notebook computers and PDAs to deliver high speed mobile Internet services.

One of the advantages of WiMAX technology is the use of Orthogonal Frequency-Division Multiplexing (OFDM) over Edge, CPRS, or HSPA to deliver higher bandwidth efficiency, and, therefore, higher data throughput, with more than one Mbps downstream and higher data rates. Adaptive modulation also increases link reliability for carrier-class operation and the possibility to keep higher order modulation at wider distance extend full capacity over longer distances.

OFDM is a digital encoding and modulation technology. It has been used successfully in wire-line access applications, such as Digital Subscriber Line (DSL) modems and cable modems as well as WiFi. Products from WiMAX Forum member companies often use OFDM-based 802.16 systems to overcome the challenges of non-line-of-sight (NLoS) propagation. OFDM achieves high data rate and efficiency by using multiple overlapping carrier signals instead of just one. All future technologies for 4G will be based upon OFDM technology.

Orthogonal Frequency Division Multiple Access (OFDMA) is enhanced OFDM and is used in Mobile WiMAX technology and the IEEE 802.16e-2005 standard. It is a multi-user version of Orthogonal Frequency-Division Multiplexing (OFDM). The difference between the two technologies is that OFDMA assigns subsets of sub-carriers to individual users allowing simultaneous low data rate transmission from several users.

SUMMARY

In various embodiments, the data plane may be abstracted from a control plane in a wireless network such as WiMax, WiFi, LTE or the like. In some embodiments, a routing device comprises a control module, a service module, and a router module. The control module may be configured to receive communication instructions from a control server. The service module may be configured to process the communication instructions and provide data path instructions based on the communication instructions. The router module may be configured to receive data from a source device and route the processed data to a target device based on the data path instructions. The control server may comprise a WiMax server such as an ASN server, LTE server, or CSN server. In one example, the control server comprises the ASN server and the routing device communicates with the ASN server over an R7 interface.

In some embodiments, the communication instructions comprise instructions to tunnel the received data using one of a plurality of GRE tunnels. The communication instructions may comprise instructions to tunnel the received data using one of a plurality of IP tunnels.

A base station may comprise the routing device. In some embodiments, the communication instructions comprise instructions to tunnel the received data using one of a plurality of IP tunnels and wherein the target device comprises a CSN server. Alternately, the communication instructions may comprise instructions to process the received data using a VLAN protocol. The CSN server may comprise the routing device.

In various embodiments, a method comprises receiving communication instructions from a control server, receiving data from a source device, processing the data based on the communication instructions, and routing the processed data to a target device.

A system may comprise a means for receiving communication instructions from a control server and receiving data from a source device, means for processing the data based on the communication instructions, and a means for routing the processed data to a target device.

A computer readable medium may comprise instructions. The instructions may be executable by a processor to perform a method. The method may comprise receiving communication instructions from a control server, receiving data from a source device, processing the data based on the communication instructions, and routing the processed data to a target device.

Various systems and methods described herein may relate to distributed data routing over a wireless network. An exemplary method may comprise receiving routing data by a routing element of a point to point wireless network, the routing data comprising routing criteria and a plurality of path identifiers which identify a plurality of paths through the point to point wireless network, storing the routing data by the routing element, receiving a packet of data, determining a destination node of the packet of data, the destination node being identified using the routing data as accessible by two or more paths of the plurality of paths, determining, based on the routing criteria of the routing data, at least one path of the plurality of paths to transmit the packet of data to reach the destination node, and transmitting the packet of data to a first node of the determined at least one path of the point to point wireless network.

The routing criteria may comprise a rule to transmit over a second path of the plurality of paths if a first path of the plurality of paths is not functional and/or a rule to transmit over a second path of the plurality of paths if a first path of the plurality of paths is congested. The method may further comprise determining, by the network element, congestion of the first path by tracking network traffic transmitted from the network element to one or more nodes of the first path. Determining, based on the routing criteria of the routing data, at least one path of the plurality of paths to transmit the packet of data may comprise determining to transmit the packet of data over a second path of the plurality of paths when congestion of the first path exceeds a predetermined limit.

In some embodiments, the routing criteria comprise a capacity of the destination node associated with a first path of the plurality of paths. Determining, based on the routing criteria of the routing data, at least one path of the plurality of paths to transmit the packet of data may comprise determining to transmit the packet of data over a second path of the plurality of paths based on an amount of traffic reaching the capacity of the destination node associated with the first path of the plurality of paths.

The routing criteria may comprise a time of day when at least one path of the plurality of paths may be congested. The routing criteria may comprise a performance metric. Determining, based on the routing criteria of the routing data, at least one path of the plurality of paths to transmit the packet of data may comprise determining to transmit the packet of data over a second path of the plurality of paths when a path performance value of a first path of the plurality of paths falls below the performance metric.

In various embodiments, each path of the plurality of paths comprises a VLAN. The point to point wireless network may comprise an MPLS network or a microwave network. In some embodiments, the point to point wireless network is a backhaul for a cellular communication network. Further, the point to point wireless network may be a WiMax network.

An exemplary point to point wireless network may comprise a network interface, storage, a data module, and a routing module. The network interface may be configured to receive routing data of a point to point wireless network, the routing data comprising routing criteria and a plurality of path identifiers which identify a plurality of paths through the point to point wireless network and configured to receive a packet of data. Storage may be configured to store the routing data. The data module may be configured to determine a destination node of the packet of data, the destination node being identified as accessible by two or more paths of the plurality of paths. The routing module may be configured to determine, based on the routing criteria of the routing data, at least one path of the plurality of paths to transmit the packet of data to reach the destination node. The transmission module may be configured to transmit the packet of data to a first node of the determined at least one path of the point to point wireless network.

An exemplary non-transitory computer readable medium may comprise instructions that are executable by a processor to perform a method. The method may comprise receiving routing data by a routing element of a point to point wireless network, the routing data comprising routing criteria and a plurality of path identifiers which identify a plurality of paths through the point to point wireless network, storing the routing data by the routing element, receiving a packet of data, determining a destination node of the packet of data, the destination node being identified using the routing data as accessible by two or more paths of the plurality of paths, determining, based on the routing criteria of the routing data, at least one path of the plurality of paths to transmit the packet of data to reach the destination node, and transmitting the packet of data to a first node of the determined at least one path of the point to point wireless network.

DETAILED DESCRIPTION OF EMBODIMENTS

In various embodiments, the data plane may be abstracted from a control plane in a wireless network such as WiMax, WiFi, LTE or the like. Data plane (i.e., forwarding plane) functions, although controlled through communications from the control plane, may be performed on a separate device. The device performing the data plane functions may be completely ignorant of the nature of the data being routed. As a result, the data plane device may be used by different wireless network servers utilizing different architectures.

For example, in a WiMax architecture, access service network (ASN) data plane functions may be performed by a routing device rather than an access service network server (ASN server). Together, the routing device and the ASN server may comprise an ASN gateway. The routing device, however, may be agnostic of the ASN server. As a result, the ASN server may be replaced by any wireless network server (e.g., for a WiFi or LTE architecture) and continue to work with the digital device to perform data path functions. Alternately, the routing device may be replaced with another routing device that performs routing in a different manner, however, the ASN server (e.g., without reconfiguration) and the new routing device may still perform the function of the ASN gateway.

In various embodiments, the rest of the wireless network devices (apart from the ASN server and the routing device) will not need to be reconfigured or altered even though the ASN server may be performing control plane functions and the routing device may be performing data plane functions. In other words, from the perspective of base stations (BSs), other ASNs, or a connectivity service network (CSN), the ASN server paired with the routing device may appear and perform as a typical ASN gateway.

In some embodiments, a decentralized data path as described herein is simpler in implementation than an integrated data path (e.g., the integrated data path products tend to be complex products which leads to costly systems that may be buggy). For example, traditional ASN and/or CSN servers tend to perform both control plane and data plane functions. However, in some embodiments, the routing device comprising an off-the-shelf router (e.g., Juniper MX or M series router) may perform the data plane functions thereby simplifying the function of the ASN server. By simplifying the function of the ASN and/or CSN server, the ASN and/or CSN server may be less expensive and more reliable.

Figure 1:
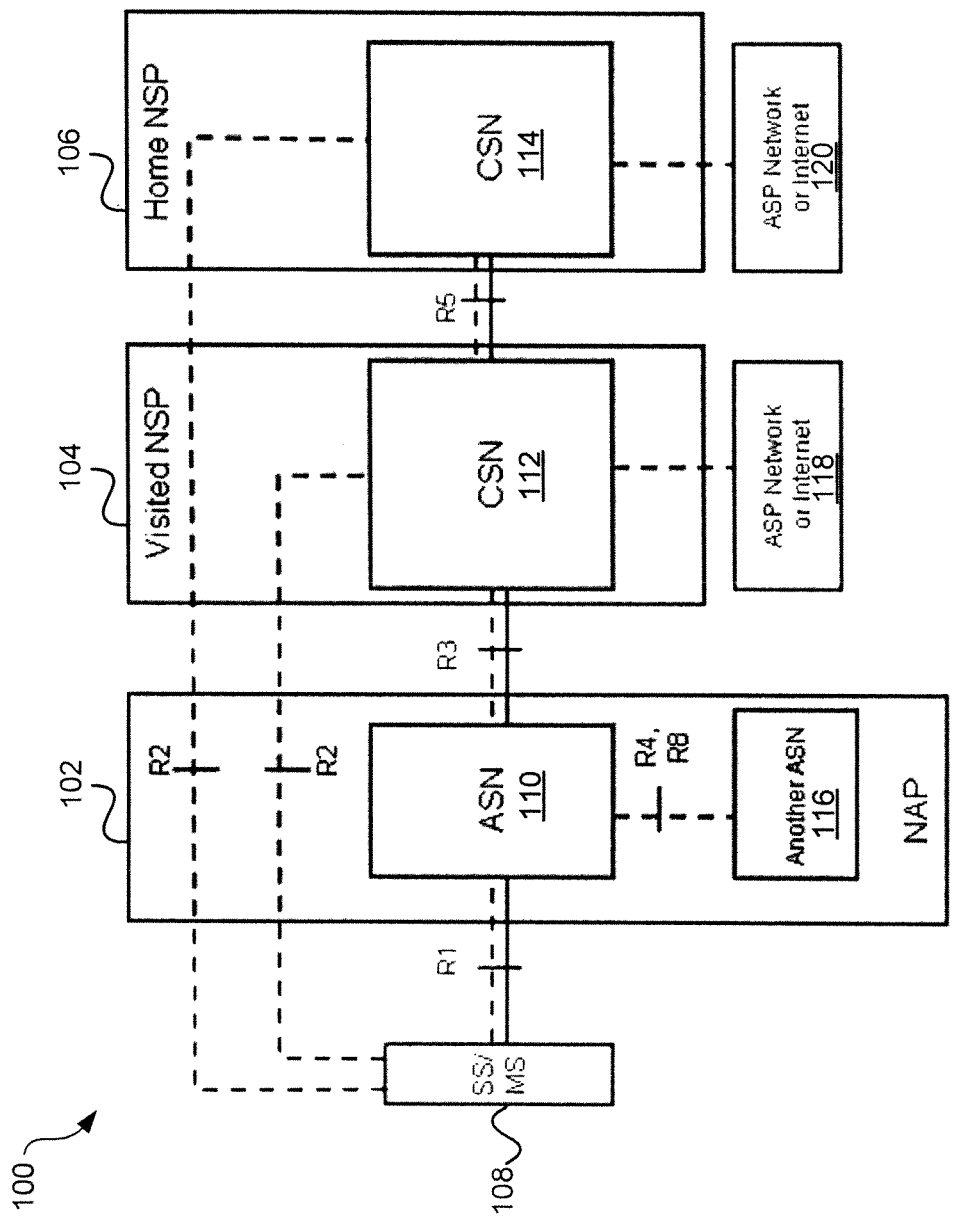
FIG. 1 illustrates an example of a centralized architecture of a WiMax or 802.16e system in the prior art.

FIG. 1 illustrates an example of a centralized architecture of a WiMax or 802.16e system in the prior art. FIG. 1 illustrates a WiMAX Network Reference Model (NRM) 100 comprising the following logical entities: subscriber station/mobile station (SS/MS) 108, a network access provider (NAP) 102, a visited network service provider (visited NSP) 104, and a home network service provider (home NSP) 106. The NAP 102 comprises an access server network (ASN) 110 and another ASN 116. The visited NSP 104 comprises a connectivity service network (CSN) 112. The home NSP 106 comprises CSN 114.

The figure depicts normative reference points R1-R5. Each of the entities, SS/MS 108, ASN 110 and 116, and CSN 112 and 114 represent a grouping of functional entities. Each of these functions may be realized in a single physical device or may be distributed over multiple physical devices. The grouping and distribution of functions into physical devices within a functional entity (such as the ASN 110) is an implementation choice; a manufacturer may choose any physical implementation of functions, either individually or in combination, as long as the implementation meets the functional and interoperability requirements.

As shown, CSN 114 communicates with (transfers data to and receives data from) a network such as the Internet (e.g., application service provider (ASP) network or Internet 120). Similarly, the CSN 112 may also communication with the ASP network or Internet 118. Further, the CSN 112 and/or 114 communicates with one or more ASNs such as ASN 110. The ASN 110 communicates with another ASN 116. Each ASN may include an ASN-GW (ASN gateway) and a plurality of base stations (BSs) not depicted. The ASN gateway may comprise an ASN server which is in communication with CSN 112 over an interface (e.g., an R3 interface). The ASN gateway also communicates with one or more base stations (BSs) over respective interfaces (e.g., R6). Each BS serves the communication needs of mobile stations (MS) or subscriber stations (SSs) within a coverage area.

A BS communicates with one or more mobile stations over an air-interface governed by, for example, an R1 protocol or R1 interface. The R1 interface is between the SS/MS 108 and the ASN 110 as per the air-interface (PHY and MAC) specifications (IEEE P802.16d/e). R1 may include additional protocols related to the management plane.

Furthermore, BS in different ASNs may directly communicate with one another over respective interfaces (e.g., R8 interfaces). Additional functions that may be a part of the BS may include (but are not limited to) micromobility management functions, such as handoff riggering and tunnel establishment, radio resource management, QoS policy enforcement, traffic classification, DHCP (Dynamic Host Control Protocol) proxy, key management, session management, and multicast group management.

The ASN gateway may be configured to act as a layer 2 traffic aggregation point within an ASN 110. The ASN server communicates with the CSN 112 over an R3 interface. The R3 interface is the interface between the ASN 110 and the CSN 112 to support AAA, policy enforcement and mobility management capabilities. It also encompasses the bearer plane methods (e.g., tunneling) to transfer IP data between the ASN 110 and the CSN 112.

Additional functions of the ASN server may include, but are not limited to, intra-ASN location management and paging, radio resource management and admission control, caching of subscriber profiles and encryption keys, AAA client functionality, establishment and management of mobility tunnel with base stations, QoS and policy enforcement, foreign agent functionality for mobile IP, and routing to the selected CSN.

The ASN server may also communicate with another ASN 116 over an R4 interface. The R4 interface consists of a set of control and bearer plane protocols originating/terminating in various entities within the ASN 110 that coordinate MS mobility between ASNs. In Release 1, R4 is the only interoperable interface between heterogeneous or dissimilar ASNs.

In operation, the CSN 112 and/or 114 may operate as the home agent (HA) and may also provide the authentication, authorization and accounting functions (AAA server). As shown, the CSN 112 may also communicate with the SS/MS 108 via an R2 interface. The R2 interface between the SS/MS 108 and CSN 112 and/or CSN 114 is associated with authentication, services authorization, IP Host Configuration management, and mobility management. This is a logical interface thus may not reflect a direct protocol interface between SS/MS 108 and CSN 112 or CSN 114. The ASN gateway may operate as the gateway for routing data to the respective base stations among other things, and the base stations handle the communication needs of the mobile stations (e.g., SS/MS 108).

The CSN 112 may also communicate with another CSN 114 over an R5 interface. The R5 interface consists of a set of control plane and bearer plane protocols for internetworking between CSNs operated by either the home or visited NSP.

The CSN 112 may be configured to provide connectivity to the Internet, ASP, other public networks and corporate networks. The CSN 112 may be owned by the NSP and include AAA servers that support authentication for the devices, users, and specific services. The CSN 112 may also provider per user management of QoS and security. The CSN 112 may be responsible for IP address management, support for roaming between different NSPs, location management between ASNs, and mobility and roaming between ASNs. Further, CSN 112 can also provide gateways and interworking with other networks, such as PSTN (public switched telephone network), 3GPP, and 3GPP2. Those skilled in the art will appreciate that the CSN 112 and the CSN 114 may perform similar features.

Figure 2:
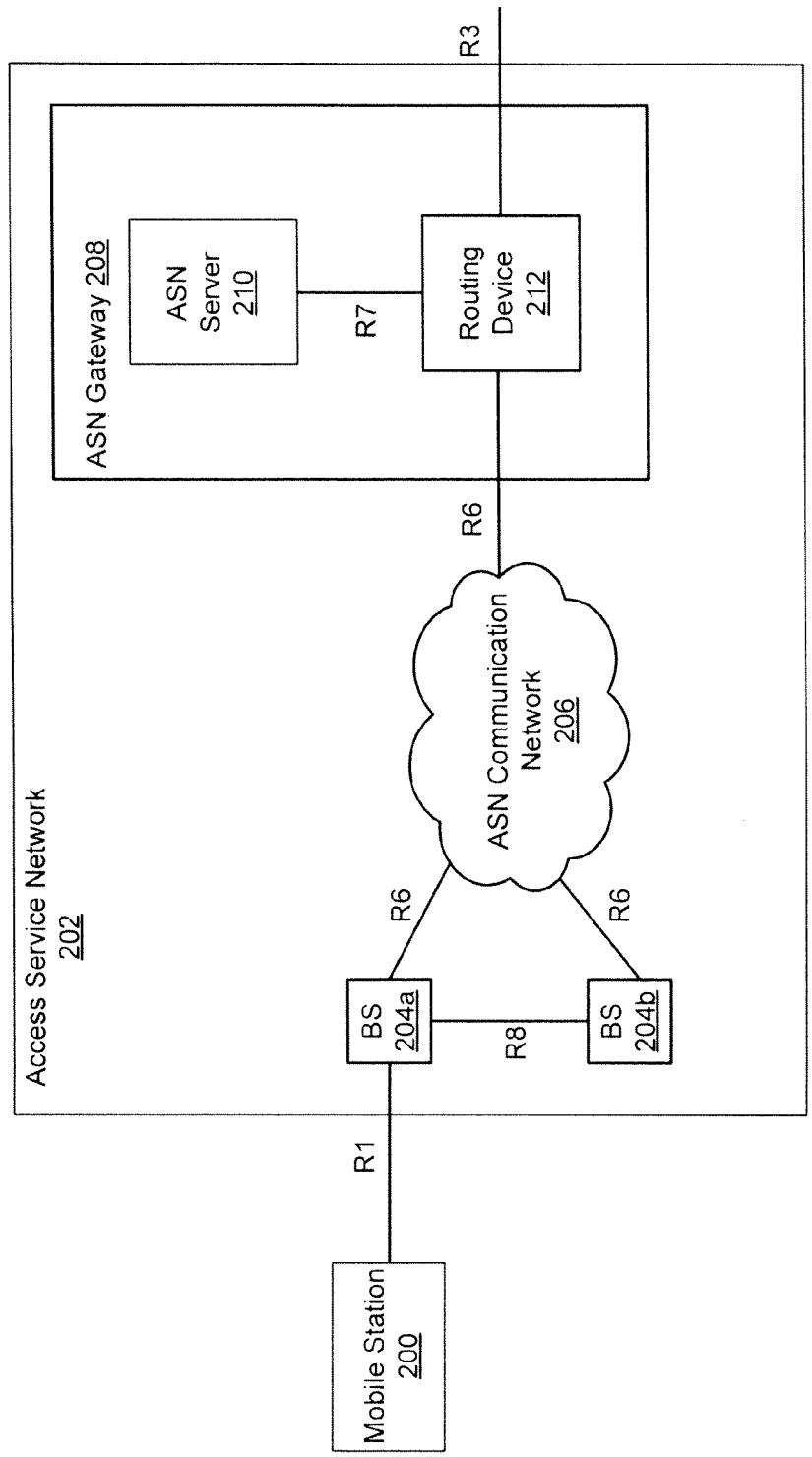
FIG. 2 is a block diagram of an exemplary access service network.

FIG. 2 is a block diagram of an exemplary access service network (ASN) 202. In various embodiments, the traditional functions of an ASN server may be separated between control and data path processing. The data path processing may be performed by a routing device. When paired, the ASN router and the routing device may comprise a seamless ASN gateway.

A mobile station (MS) 200 (e.g., a digital device such as a computer, smartphone, PDA, music player, ebook reader, or media player) communicates with the ASN 202. In one example, the MS 200 communicates with the Internet over the ASN 202. The MS 200 may communicate with the BS 204a over RF or any frequency range.

The ASN 202 comprises BS 204a and 204b, an ASN communication network 206, and an ASN gateway 208. The ASN gateway 208 comprises an ASN server 210 and a routing device 212. The BS 204a may also communicate with the ASN gateway 208 over an R6 interface. The R6 interface consists of a set of control and bearer plane protocols for communication between the BS 204a and the ASN gateway 208. The bearer plane consists of intra-ASN data path or inter-ASN tunnels between the BS and ASN gateway 208. The control plane includes protocols for IP tunnel management (establish, modify, and release) in accordance with the MS mobility events. R6 may also serve as a conduit for exchange of MAC states information between neighboring BSs.

The BS 204a may communicate with another BS (e.g., BS 204b) over an R8 interface. The R8 interface consists of a set of control plane message flows and, in some situations, bearer plane data flows between the base stations to ensure fast and seamless handover. The bearer plane consists of protocols that allow the data transfer between base stations involved in handover of a certain mobile station. The control plane consists of the inter-BS communication protocol defined in IEEE 802.16 and additional set of protocols that allow controlling the data transfer between the Base Stations involved in handover of a certain mobile station.

The BS 204a is any communication device configured to communicate with the MS 200 (e.g., via RF) thereby creating a service flow. The BS 204a may comprise a digital device. Data from the MS 200 is provided by the BS 204a to the ASN gateway 208. The service flow may be tunneled through a generic routing encapsulation (GRE) tunnel to the routing device 212. In one example, the GRE tunnel creates a virtual point-to-point link between the BS 204a and the routing device 212.

The ASN communication network 206 is any network that supports communication between the BS 204a and BS 204b with the ASN gateway 208. In some embodiments, the BS 204a may communicate with BS 204b via the ASN communication network 206. The ASN communication network 206 may support communication via R6 and/or R8 protocols.

The ASN server 210 performs control plane functions of the ASN gateway 208. As discussed herein, the ASN may support AAA, policy enforcement and mobility management capabilities. Additional functions of the ASN server may include, but are not limited to, intra-ASN location management and paging, radio resource management and admission control, caching of subscriber profiles and encryption keys, AAA client functionality, establishment and management of mobility tunnel with base stations, and QoS and policy enforcement.

The routing device 212, when paired with the ASN server 210, may comprise a full NWG compatible ASN gateway. The routing device 212 may comprises any digital device configured to route data and/or handle data path processing.

In one example, the routing device 212 distributes data from the BS 204a to a CSN (not depicted). The ASN gateway 208 may be compliant to WiMax Forum Profile C which can be used to control non-Telsima BSs.

The routing device 212 may receive data from a source device (e.g., the MS 200 via the BS 204a) and provide the data to a target device (e.g., the CSN not depicted). The source device is any digital device that provides data that is received by the routing device 212. The target device is any digital device that receives the data that was provided by the source device via the routing device 212.

The routing device 212 may be configured to perform data path processing. In one example, routing device 212 maybe configured to generate (or assist in generating) a generic route encapsulation (GRE) tunnel per service flow between the routing device 212 and the BS 204a and encapsulate downlink traffic along with IP security (IPsec). The GRE maximum packet size is 1500 bytes. As a result, the maximum packet size may be set as 1400 bytes. The routing device 212 may be configured to process the nonstandard packet size when routing data between the BS 204a and the CSN.

Further, the routing device 212 may be configured to tunnel data received from the GRE tunnel to the CSN. For example, the routing device 212 may tunnel data using an IP tunnel (via the Mobile IP protocol) to provide data received from the GRE tunnel to provide the data to the CSN.

The routing device 212 may be configured to communicate with the ASN server 210 over an R7 interface. The R7 interface represents internal communication within the gateway and may carry control signals. In one example, communication instructions from the ASN server 210 are received from the routing device 212. Communication instructions comprise instructions to carry out data path functions. In one example, communication instructions indicate that data is to be received from a specific GRE tunnel data. Similarly, communication instructions may indicate that data is to be provided to a specific IP tunnel in order to transmit the data to the CSN (not depicted) via the R3 interface. Further, the communication instructions may indicate that data is to be received from a specific IP tunnel data and forwarded to a specific GRE tunnel.

Figure 3:
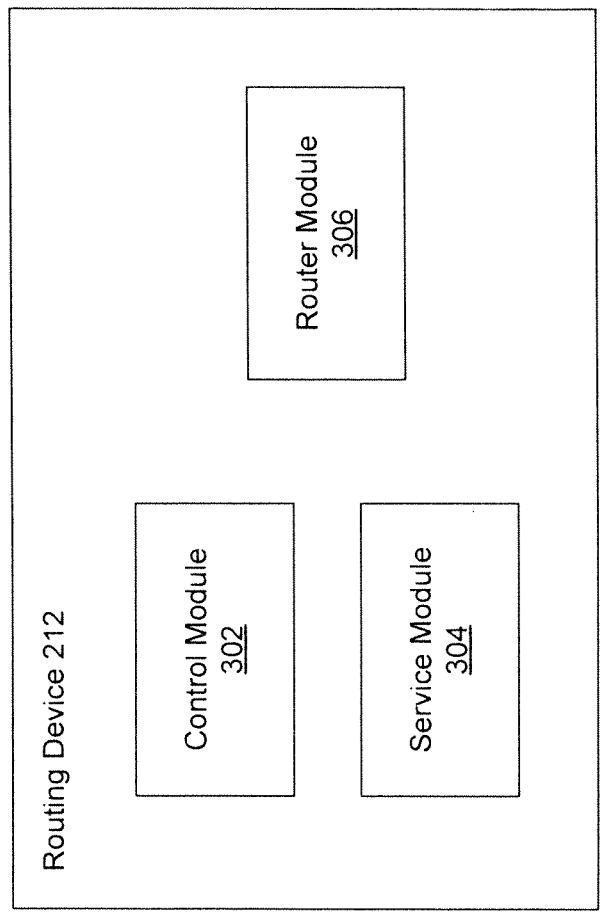
FIG. 3 is a block diagram of an exemplary routing device.

FIG. 3 is a block diagram of an exemplary routing device 212. The routing device 212 may be configured to perform data path functions for any number of wireless networks. In some embodiments, the exemplary routing device 212 comprises a control module 302, a service module 304, and a router module 306. The control module 302 is configured to receive communication instructions from a server such as the ASN server (not depicted).

The service module 304 is configured to instruct the router module 306 based on the communication instructions from the control module 302. In one example, the service module 304 processes communication instructions from the control module 302 and provides data path instructions based on the communication instructions to the router module 306. In alternate some embodiments, some or all of the communication instructions may be provided to the router module 306.

The router module 306 may comprise a router such as Juniper MX series router or an M series router. In various embodiments, the router module 306 receives data path instructions from the service module 304. For example, the router module 306 may unpack data from a specific GRE tunnel based on the instructions and provide the data to a target device.

In some embodiments, a GRE tunnel numbering scheme is determined between a negotiation between a base station and an ASN server. The control module 302 may receive communication instructions which indicate which GRE tunnel is to be used in the data path services. The service module 304 may then provide the router instructions (i.e., data path instructions) that the router must retrieve data from the specified GRE tunnel.

In other examples, the service module 304 provides instructions to the router module 306 to unpack the data from the specific GRE tunnel. The instructions may comprise some or all of the communication instructions. The service module 304 may also provide instructions to pack the data in an IP tunnel to route the data to the CNS. Alternately, the service module 304 may provide instructions to the router module 306 to unpack data from a specific IP tunnel and transmit the data through a specific GRE tunnel. The routing device 212 may further tag service flows with VLAN information for VLAN tunnel implementation.

Those skilled in the art will appreciate that, in some embodiments, the router of the router module 306 may be replaced or updated to take advantage of new functionality of a new router (e.g., a new off-the-shelf router). In some embodiments, no further changes may be made to the routing device 212 or the ASN server. In other embodiments, the types of instructions of the communication instructions may change or expand. The routing device 212 and/or the wireless server (e.g., ASN server) may be configured to provide new communication instructions to take advantage of new functionality or services. In one example, communication instructions may indicate a different tunnel may be used (rather than a GRE or IP tunnel) or a different routing technology may be implemented.

It will be appreciated that a "module" may comprise software, hardware, firmware, and/or circuitry. In one example one or more software programs comprising instructions capable of being executable by a processor may perform one or more of the functions of the modules described herein. In another example, circuitry may perform the same or similar functions. Alternative embodiments may comprise more, less, or functionally equivalent modules and still be within the scope of present embodiments. For example, as previously discussed, the functions of the various modules may be combined or divided differently.

In various embodiments, the routing device 212 may be configured to support WSG multicast. In one example, Internet Group Management Protocol (IGMP) Join packets are received by the routing device 212 via GRE tunnels that carry unicast SF. The router module 306 (e.g., via an IGMP/PIM module not depicted) processes the IGMP request per standards. The ASN server (or ASN controller) may decide what can join which flow via communication control instructions received by the control module 302. If this is the first join request, the router module 306 may add an interface to a multicast packet duplication process. The multicast data may be tagged by many means (e.g., VLAN, GRE, or MPLS). A BS may receive VLAN data as if VLAN's are GRE tunnels and put them into multicast-SF.

Those skilled in the art will appreciate that IPTV may be supported through the WSG multicast mechanism. In various embodiments, each channel is a specific multicast-SF on RF downlink which may be connected to a specific VLAN tag. A set-top box may be configured to send an IGMP message every time a channel is changed. The set-top box may be further configured to go to the multicast-sf to get the data. If someone else is already viewing the channel, the video stream may already be on that specific data stream. If no-one is subscribed, the routing device 212 may start to send the data stream using the specific VLAN tag. The BS may receive the data packets through the VLAN tag and send the data packets to the connected multicast-SF. VLAN is further discussed in U.S. Nonprovisional application Ser. No. 11/748,476, filed May 14, 2007, entitled "Dynamic VLANS in Wireless Networks" which is hereby incorporated by reference.

Figure 4:
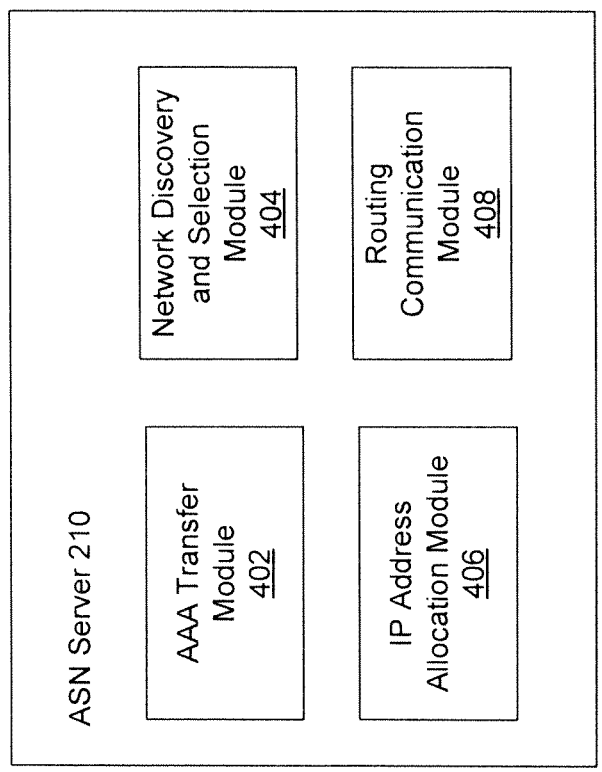
FIG. 4 is a block diagram of an exemplary ASN server.

FIG. 4 is a block diagram of an exemplary ASN server 210. As discussed herein, unlike ASN servers in the prior art, the data plane (e.g., forwarding plane) is abstracted from the control plane. As such, the ASN server 210 is configured to generate control plane messaging (e.g., communication instructions or IP service messages) which provide instructions to a routing device 212 (see FIG. 3) to perform data plane functions. As a result of the abstraction, the ASN server 210 may not perform any data plane functions (e.g., retrieving data from a GRE tunnel or transmitting data over a GRE or IP tunnel). Rather, the ASN server 210 may control those functions performed elsewhere. The ASN server 210, as a result, does not have to be configured to unpack data or to be concerned with the actual routing of packets.

The ASN server 210 may comprise an AAA transfer module 402, a network discovery and selection module 404, an IP address allocation module 406, and the routing communication module 408. The AAA transfer module 402 performs, independent of mobility mode, the transfer of AAA control messages to WiMax subscriber's Home Network Service Provider (H-NSP) for authentication, authorization, and session accounting for subscriber sessions.

The network discovery and selection module 404 performs network discovery and selection of an appropriate network service provider (NSP) that a WiMax subscriber accessess WiMax Servic(es). The IP address allocation module 406 manages Layer-3 (L3) connectivity established with a stationary subscriber or mobile subscriber (SS/MS).

The routing communication module 408 may generate and provide communication instructions to a routing device 212. Since the data plane is abstracted from the control plane, the functions of the data plane are controlled via the routing communication module 408. In some examples, the routing communication module 408 may generate communication instructions that indicate which GRE tunnel data is to be received and which IP tunnel data is to be provided. The communication instructions may be provided to the routing device 212.

In one example, the BS tunnels data received from a mobile station (MS) within an appropriate GRE tunnel. The BS and/or MS may provide control data which is received by the ASN server 210. The routing communication module 408 may receive the control data and instruct the routing device 212 to retrieve the data from the correct GRE tunnel. For example, the control module 302 of the routing device 212 may receive the instructions from the communication module 408 of the ASN server 210. The router module 306 may then retrieve the data from the correct GRE tunnel and provide the data to the target device. In some embodiments, the router module 306 may tunnel the data within an IP tunnel to the CSN as further instructed by the routing communication module 408 of the ASN server 210. For example, the ASN server 210 may control ASN/CSN tunneling and intra-ASN mobility. The ASN server 210 may also perform paging and location management. Depending on the configuration, the ASN server may also provide radio resource management as well.

The ASN server 210 may be configured for applications such as VoIP and video broadcast. For session based applications such as VoIP, the full QoS and admission may be under the control of the provider. Further, the ASN server 210 may control the QoS levels on both RF and network layers. The ASN server 210 may be configured to control the VLAN usage either putting the VLAN tags for the customers by the BS or allow the customer to tag the traffic but police the VLAN tags.

Figure 5:
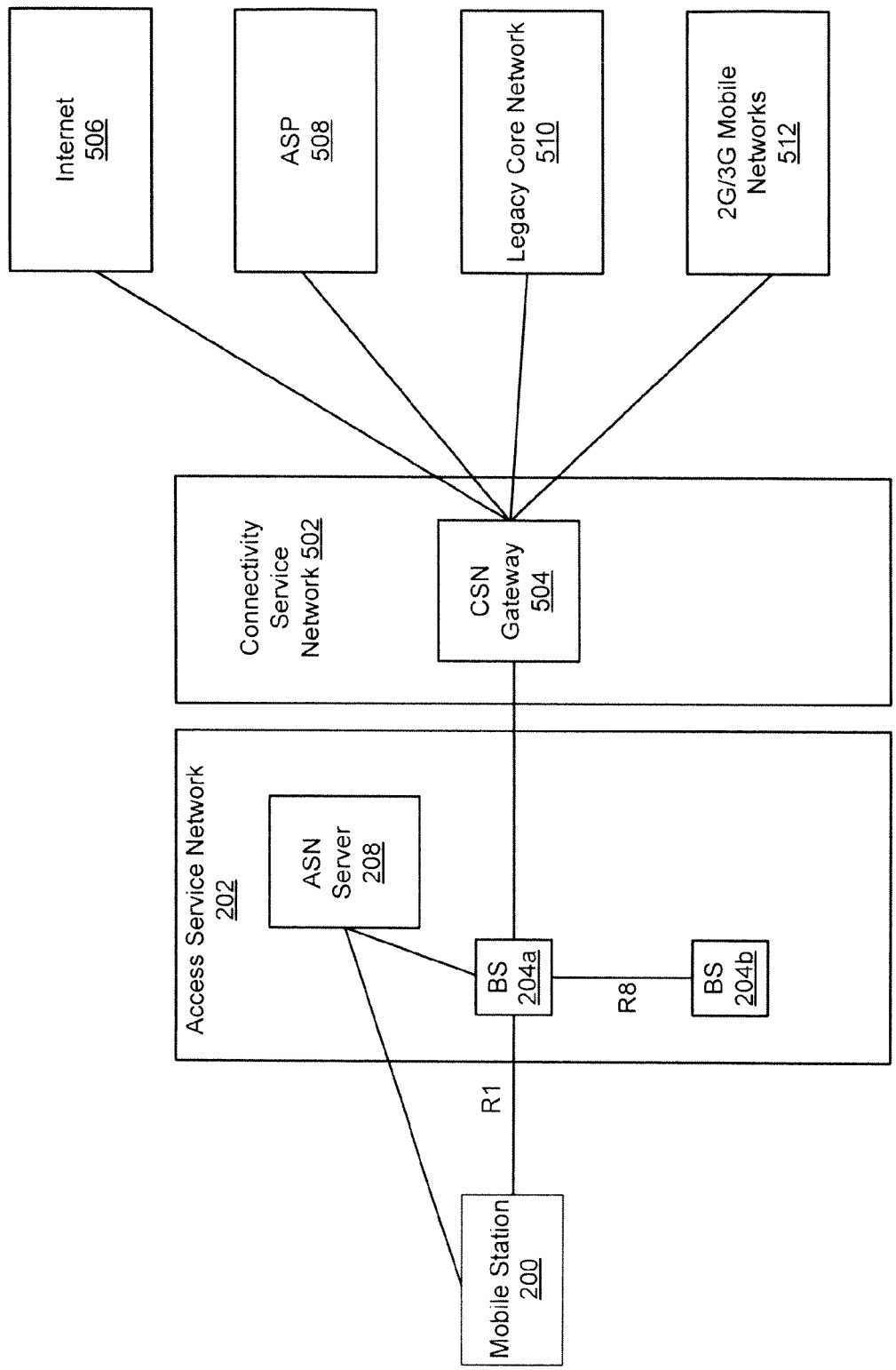
FIG. 5 is a block diagram of an exemplary WiMax network.

FIG. 5 is a block diagram of an exemplary WiMax network. In various embodiments, there is no ASN gateway, rather, the data path can be distributed through a base station (e.g., BS 204a). MS 200 sends and receives control messages directly with the ASN server 208 of the ASN 202. The MS 200 sends data to the BS 204a (via the R1 interface). The BS 204a, in addition to functions of the BS 204a described herein, may perform data path processing based on communication instructions received from the ASN server 208. In some embodiments, the BS 204a comprises a routing device such as routing device 212 (discussed herein).

The BS 204a may receive communication instructions from the ASN server 208 and data from the MS 200. In some embodiments, the data is to be provided to the CSN gateway 504 of the CSN 502. The communication instructions may instruct the BS 204a to tunnel the data from the MS 200 using an IP tunnel (via Mobile IP) to the CSN gateway 504. Alternately, the communication instructions may instruct the BS 204a to tunnel the data using a VLAN tunnel and/or provide the data to another base station (e.g., BS 204b). As instructed from the ASN server 208 via communication instructions, the routing device of the BS 204a may route accordingly.

The CSN gateway 504 may unpack the data from the IP tunnel and provide the data to the Internet 506, ASP 508, legacy core network 510, or 2G/3G Mobile network 512.

In various embodiments, one or more base stations may be reconfigured to perform routing functions or comprise a routing device 212. Those skilled in the art will appreciate that a wireless network may comprise a combination of base stations configured to perform data path functions via the routing device and unconfigured base stations. In one example, an unconfigured base station may transmit data to an ASN gateway via GRE tunneling. A configured base station, however, may perform the data path functions of the ASN gateway. As a result, data from the base station may be tunneled directly to the CSN gateway 504.

Figure 6:
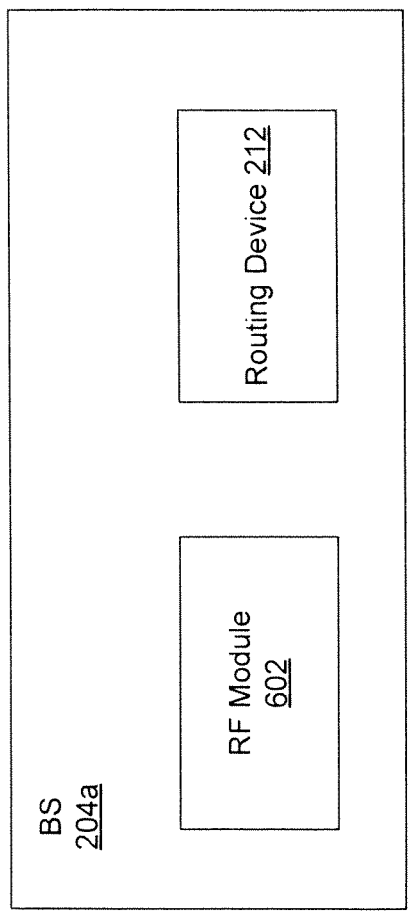
FIG. 6 is a block diagram of an exemplary base station.

FIG. 6 is a block diagram of an exemplary base station 204a. In various embodiments, there may not be any ASN gateway. In accordance with various embodiments described herein, the data plane may be abstracted to one or more base stations. As a result, the each base station may comprise the routing device 212 which receives communication instructions from the ASN server (not depicted) and routes data accordingly.

The base station 204a may comprise an RF module 602 and a routing device 212. The RF module 602 is configured to receive data from the SS/MS via RF. Although data is described as being received in RF, the data may be received by the BS 204a in any frequency.

Those skilled in the art will appreciate that the BS 204a may comprise any number of modules performing any number of functions. For example, a module may be configured to perform micromobility management functions, such as handoff triggering and tunnel establishment. One or more other modules may be configured to perform radio resource management, QoS policy enforcement, traffic classification, DHCP (Dynamic Host Control Protocol) proxy, key management, session management, and/or multicast group management.

Unlike some other embodiments described herein, each base station of a wireless network may require a routing device 212. In alternative embodiments, one or more base stations may be operably coupled to a routing device 212. The routing device 212 may receive communication instructions from the ASN server. Data may be provided to the routing device 212 "as is" or encapsulated to the routing device 212. The routing device 212 may perform data path functionality in compliance with communication instructions as described herein.

Figure 7:
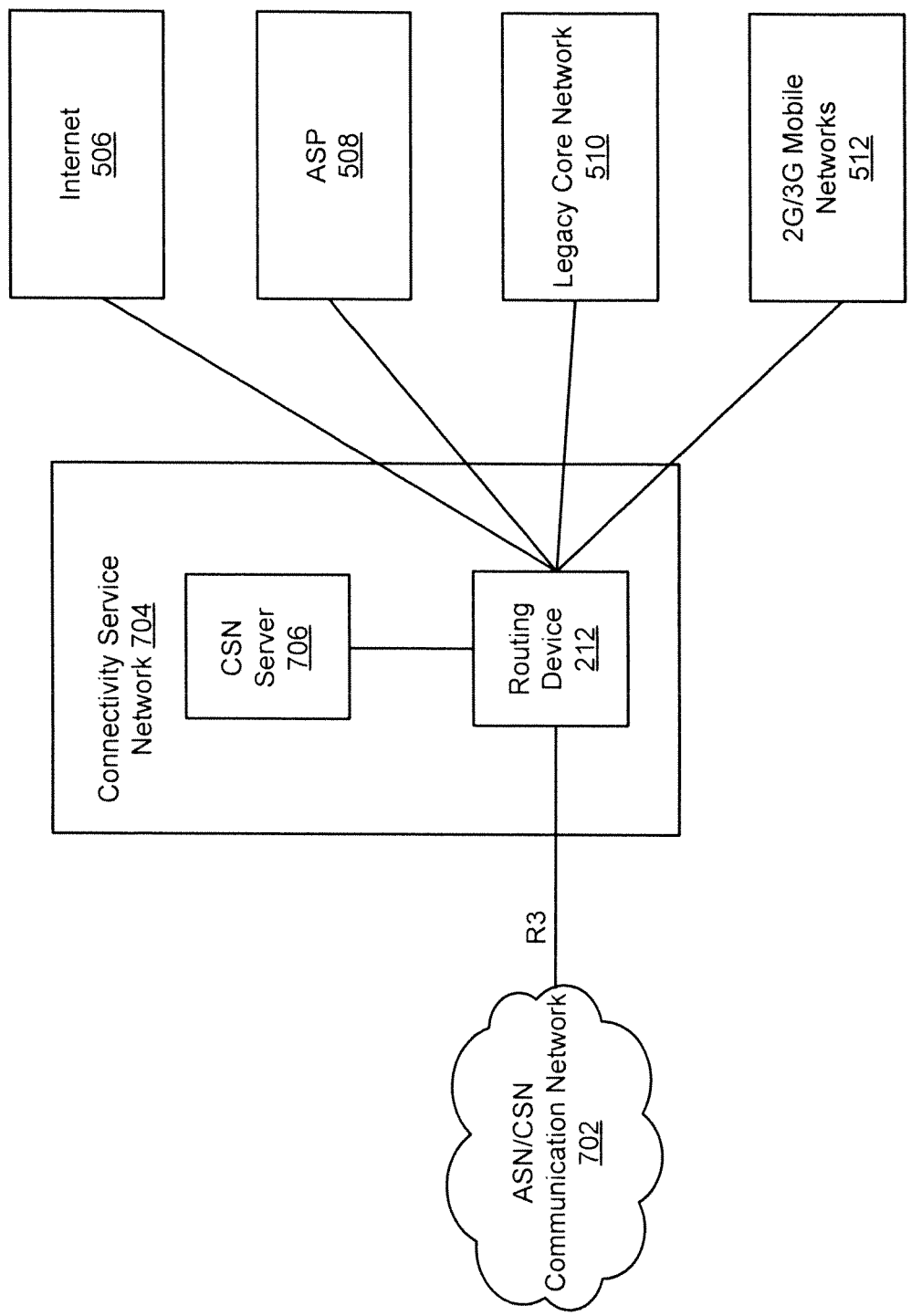
FIG. 7 is a block diagram of an exemplary connectivity service network.

FIG. 7 is a block diagram of an exemplary connectivity service network (CSN) 704. Similar to embodiments discussed herein, the control plane of the CSN may be abstracted from the data plane. In various embodiments, the same routing device 112 may be coupled to an ASN server or an CSN server without reconfiguration (see FIG. 8).

In various embodiments, the ASN/CSN communication network 702 is operably connected to the CSN 704. The CSN 704 comprises a CSN server 706 and a routing device 212. In some embodiments, when the CSN server 706 and the routing device 212 are paired, they comprise a CSN gateway. The routing device 212 is communicatively coupled with the Internet 506, the ASP 508, the legacy core network 510, and the 2G/3G mobile networks 512.

The CSN server 706 may comprise a routing communication module (not depicted). The routing communication module may generate and provide communication instructions to the routing device 212. Since the data plane is abstracted from the control plane, the functions of the data plane may be controlled via the routing communication module. In some examples, the routing communication module 408 may generate communication instructions that indicate that data is to be retrieved from a specific IP tunnel. Further, the routing communication module may instruct the routing device 212 where to route the data and if the data is to be further processes (e.g., tunneled).

Further, the CSN server 706 may be configured to perform control plane functions. In some examples, the CSN server 706 may operate as the home agent (HA) and may also provide the authentication, authorization and accounting functions (e.g., as an AAA server). The CSN server 706 may also be configured to perform Host Configuration management and mobility management. The CSN server 706 may also provider per user management of QoS and security. Further, CSN server 706 can also provide gateways and interworking with other networks, such as PSTN (public switched telephone network), 3GPP, and 3GPP2.

Figure 8:
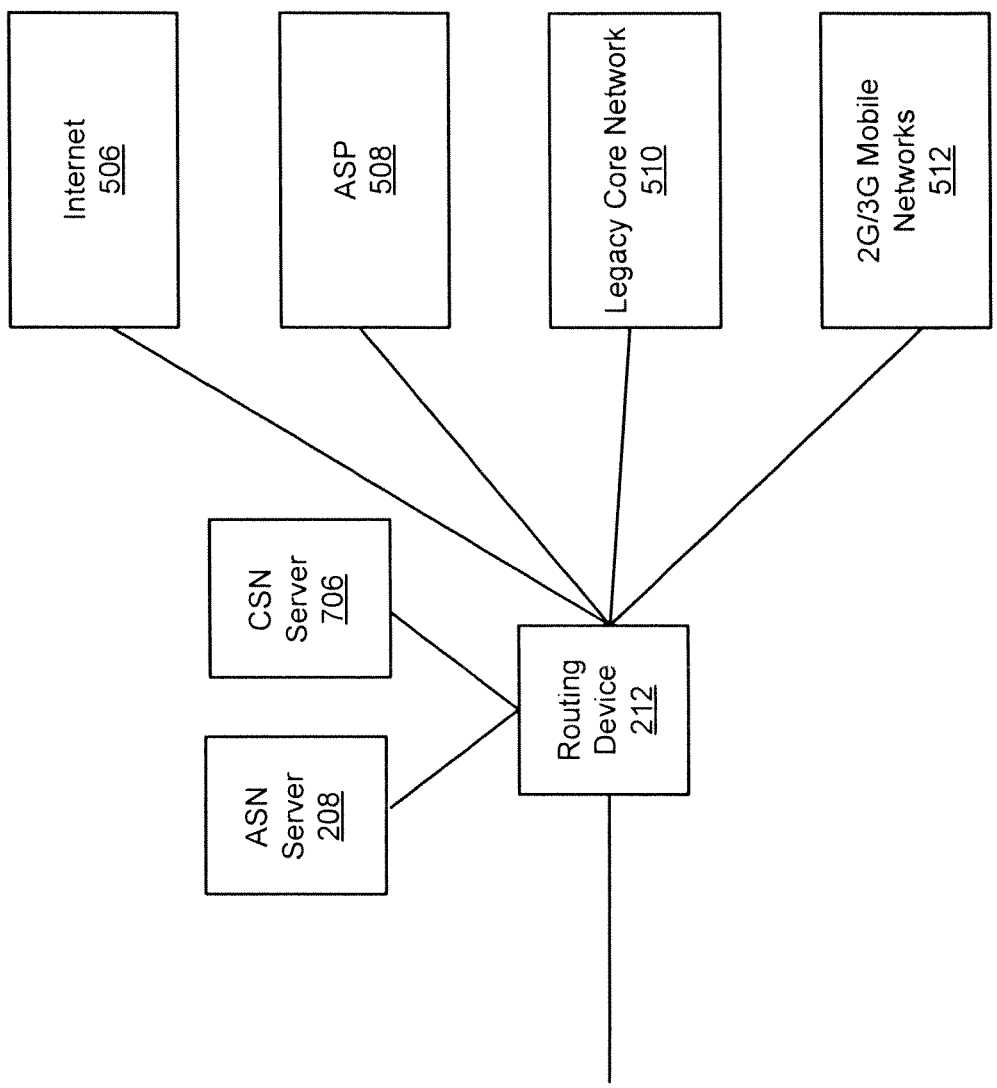
FIG. 8 is a block diagram of an ASN server and a CSN server operationally coupled to a routing device in some embodiments.

FIG. 8 is a block diagram of an ASN server 208 and a CSN server 706 operationally coupled to a routing device 212 in some embodiments. Due to data path abstraction, as described herein, the routing device 212 may receive communication instructions from any source (e.g., the ASN server 208 or CSN server 708) without further configuration. The routing device 212 may be agnostic as to the server that sends the communication instructions or why the communication instructions were generated. In some embodiments, one or more chassis may comprise the ASN server 208, the CSN server 706 and the routing device 212.

Those skilled in the art will appreciate that the ASN server 208 and the CSN server 706 may be in communication with the same routing device 212. In one example, the routing device 212 may retrieve data from a base station and/or mobile station from a GRE tunnel and provide the data "as is" (e.g., after unpacking the data from the GRE tunnel) to the Internet 506, the ASP 508, the legacy core network 510, and/or the 2G/3G mobile networks 512.

Since the CSN server 706 may be local to the routing device 212, the routing device 212 may need not tunnel the received data in an IP tunnel. In one example, the routing device 212 may receive communication instructions from the ASN server 208 to retrieve the data from the specific GRE tunnel but then provide the data (without further tunneling or encapsulation) to a destination.

In another embodiment, a MS or BS may provide data directly to the routing device 212 via IP tunneling (e.g., the CSN side). Similar to the ASN server example, the routing device 212 may be directed to unpack the data from the IP tunnel by communication instructions from the CSN server 706 and then provide the data "as is" to the destination.

Figure 9:
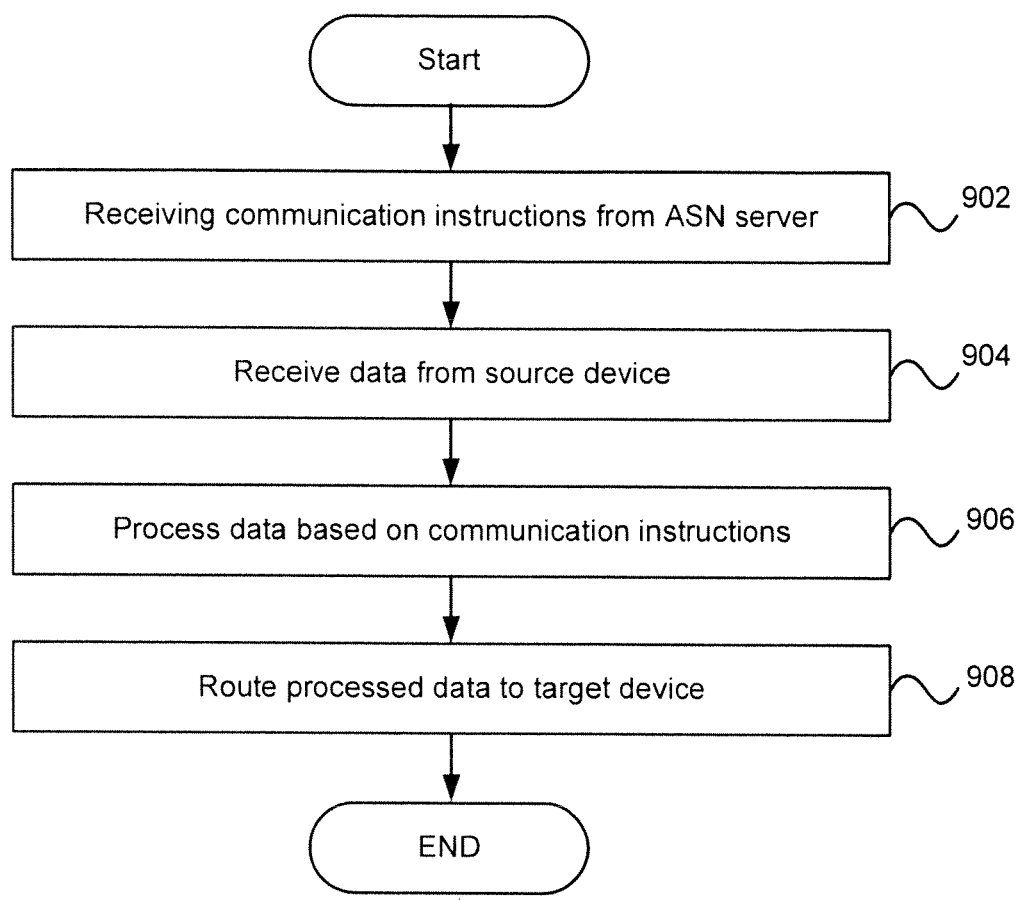
FIG. 9 is a flow diagram of an exemplary method for decentralized distribution of data in a WiMax network.

FIG. 9 is a flow diagram of an exemplary method for decentralized distribution of data in a WiMax network. In step 902, the control module 302 (see FIG. 3) of the routing device 212 receives communication instructions from an ASN server 210 (e.g., from the routing communication module 408—see FIG. 4). In some embodiments, the communication instructions comprise instructions to retrieve data (e.g., a service flow) from a specific GRE tunnel.

In step 904, the router module 306 of the routing device 212 receives data from a source device such as a BS. In step 906, the service module 304 instructs the router module 306 of the routing device to process data based on the communication instructions (e.g., via data path instructions). For example, the service module 304 identifies which GRE tunnel to unpack data from and instructs the router module 306 accordingly.

In step 908, the router module 306 routes the data (e.g., the service flow) based on the instructions from the service module 304 to the target device (e.g., a device on the Internet, an ASP server, or the like).

Figure 10:
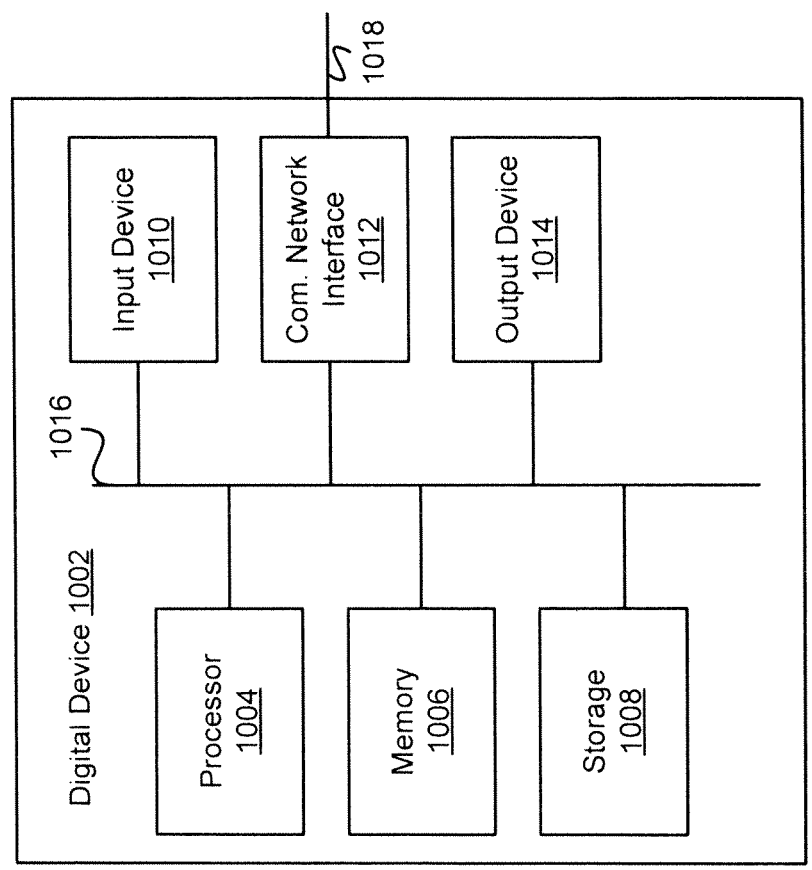
FIG. 10 is a block diagram of an exemplary digital device.

FIG. 10 is a block diagram of an exemplary digital device 1002. Any of the SS, MS, ASN server, CSN server, digital router, may be an instance of the digital device 1002. The digital device 1002 comprises a processor 1004, memory 1006, storage 1008, an input device 1010, a communication network interface 1012, and an output device 1014 communicatively coupled to a communication channel 1016. The processor 1004 is configured to execute executable instructions (e.g., programs). In some embodiments, the processor 1004 comprises circuitry or any processor capable of processing the executable instructions.

The memory 1006 stores data. Some examples of memory 1006 include storage devices, such as RAM, ROM, RAM cache, virtual memory, etc. In various embodiments, working data is stored within the memory 1006. The data within the memory 1006 may be cleared or ultimately transferred to the storage 1008.

The storage 1008 includes any storage configured to retrieve and store data. Some examples of the storage 1008 include flash drives, hard drives, optical drives, and/or magnetic tape. Each of the memory system 1006 and the storage system 1008 comprises a computer-readable medium, which stores instructions or programs executable by processor 1004.

The input device 1010 is any device that inputs data, e.g., mouse and keyboard. The output device 1014 outputs data, e.g., a speaker or display. Those skilled in the art will appreciate that the storage 1008, input device 1010, and output device may be optional. For example, the routing device may comprise the processor 1004 and memory 1006 as well as a device to receive and output data (e.g., the communication network interface 1012 and/or the output device 1014).

The communication network interface (com. network interface) 1012 may be coupled to a network (e.g., communication network 106) via the link 1018. The communication network interface 1012 may support communication over an Ethernet connection, a serial connection, a parallel connection, and/or an ATA connection. The communication network interface 1012 may also support wireless communication (e.g., 802.11 a/b/g/n, WiMax, LTE, WiFi). It will be apparent to those skilled in the art that the communication network interface 1012 can support many wired and wireless standards.

It will be appreciated by those skilled in the art that the hardware elements of the digital device 1002 are not limited to those depicted in FIG. 10. A digital device 1002 may comprise more or less hardware, software and/or firmware components than those depicted (e.g., drivers, operating systems, touch screens, biometric analyzers, etc.). Further, hardware elements may share functionality and still be within various embodiments described herein. In one example, encoding and/or decoding may be performed by the processor 1004 and/or a co-processor located on a GPU (i.e., Nvidia).

The above-described functions and components can comprise instructions that are stored on a storage medium such as a computer readable medium. Some examples of instructions include software, program code, and firmware. The instructions can be retrieved and executed by a processor in many ways.

In planning point to point microwave networks, it is becoming apparent that the backhaul may become the bottleneck. With current technological advances, planning and implementing efficient communication networks has become increasingly common. For example, it is not uncommon for microwave network planners to implement a multi-spanning tree protocol. A multi-spanning tree protocol may map several VLANs to a reduced number of spanning tree instances since most networks do not need more than a few logical topologies.

Routing of data, however, has been inefficient due to network congestion, link failure between network nodes, and/or the lack of using nodes in a network to full capability. For example, the bottom of the spanning tree may comprise residential and business facilities with unbalanced needs (e.g., residences may consume more bandwidth at night and businesses may consume more bandwidth during the day). Further, as needs increase at some nodes on the branches of the tree, various nodes may slow data transmission due to congestion or link failure. As such, multi-spanning tree networks may be inefficient, require additional equipment, and/or require upgraded equipment with enhanced capacity.

Figure 11:
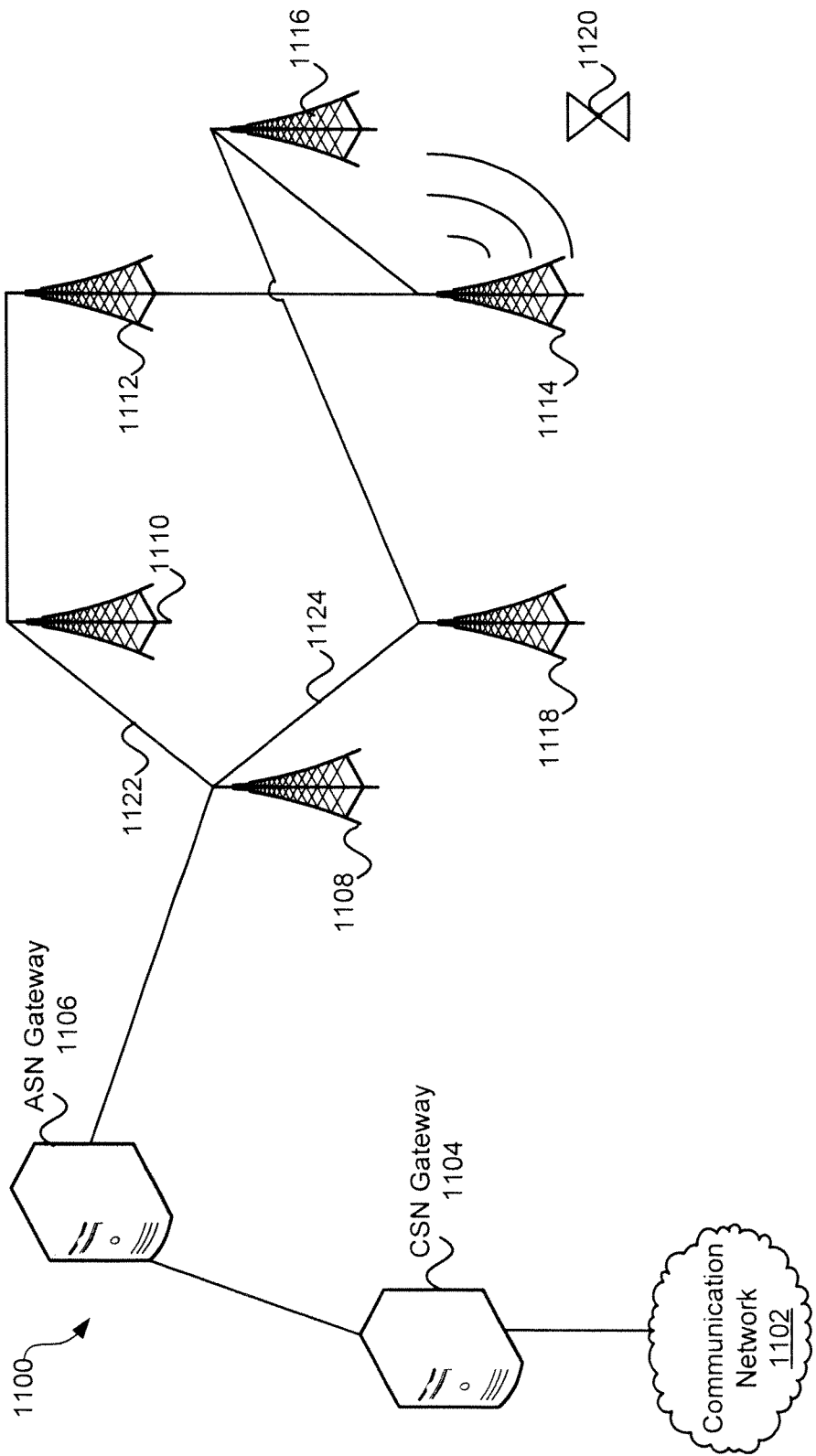
FIG. 11 is a block diagram of an exemplary microwave network.

FIG. 11 is a block diagram of an exemplary wireless network 1100. The microwave network 1100 may comprise a communication network 1102, a CSN gateway 1104, an ASN gateway 1106, base stations 1108-1118, and subscriber station 1120. The base station 1108 may have two separate paths to provide network traffic including path 1122 and path 1124.

In some embodiments, the wireless network 1100 is a WiMax network. Those skilled in the art will appreciate that the wireless network 1100 may be any network including an LTE network or any other 4G network. Further, the communication network 1102 may be any network or combination of networks. For example, the communication network 1102 may comprise the Internet, ASP, other public network, or a corporate network. In some embodiments, the communication network 1102 may include one or more a LANs, WANs, or combination.

The CSN gateway 1104 may provide connectivity to the Internet, ASP, other public networks, and/or corporate networks (e.g., communication network 1102). The CSN gateway 1104 may perform any functionality including, but not limited to, IP address allocation, AAA proxy or server, policy and QoS management, billing and interoperator settlement, inter-CSN tunneling to support roaming, inter-ASN mobility management and connectivity infrastructure and policy control for such services as Internet access and access to other networks.

The ASN gateway 1106 typically acts as a layer 2 traffic aggregation point within an ASN. Those skilled in the art will appreciate that an ASN may be decomposed into one or more base stations (e.g., base stations 1108-1118) and one or more ASN gateways 1106. The ASN gateway 1106 may perform any functionality, including, but not limited to ASN location management and paging, network session and mobility management, admission control and temporary caching of subscriber profiles, authentication, delivery of RADIUS/DIAMETER messages, mobility tunnel establishment and management, client for session/mobility management, service flow authorization (SFA), foreign agent functionality, and routing to one or more CSNs such as CSN gateway 1104.

Although the base stations in FIG. 11 are depicted as being associated with the ASN gateway 1106, those skilled in the art will appreciate that there may be multiple ASN gateways 1106 associated with the base stations. For example, one or more base stations may communicate with a plurality of different ASN gateways 1106 for load balancing or redundancy. Further, as discussed herein, the ASN server may be optional and thereby systems and methods discussed herein may be embodied in any wireless network architecture (e.g., for a WiFi or LTE architecture) and continue to work with the digital device to perform data path functions.

Base stations 1108-1118 may provide an air interface to the subscriber station 1120 (e.g., a mobile station). In some embodiments, each base station may represent one sector with one frequency assignment implemented the IEEE 802.16e interface to the subscriber stations. A base station may handle such functions as scheduling for the uplink and the downlink, traffic classification, and service flow management (SFM) by acting as a QoS policy enforcement point (PEP) for traffic. The base station may also support tunneling protocol with the ASN gateway 1106, provide DHCP proxy functionality, and relay authentication messages between the subscriber station 1120 and the ASN gateway 1106. One or more base stations may provide any functionality.

The base stations 1108-1118 are depicted in FIG. 11 as being in a ring topology whereby each base station communicates with two other base stations of the ring. Those skilled in the art will appreciate that there may be any number of base stations in any physical layout. Further, the base stations may communicate over multiple ring networks. In various embodiments, any number of base stations may communicate over multiple rings.

In some embodiments, the base stations 1108-1118 are "main" base stations that may communicate with one or more other base stations. For example, a plurality of "branch" base stations may communicate with each other. One or more of the "branch" base stations, however may communicate with the communication network 1102 via the ring network of "main" base stations 1108-1118. Those skilled in the art will appreciate that the network depicted in FIG. 11 is simplified and that any number of base stations and different topologies may be envisioned within various embodiments described herein.

The subscriber station 1120 may be any subscriber station, such as indoor customer premise equipment (CPE) or outdoor CPE, which is configured to communicate over the communication network 1102 via the backhaul.

Paths 1122 and 1124 may comprise wired and/or wireless communication paths over which base stations 1108-1118 may communicate with each other. For example, base station 1108 may communicate with base station 1110 over path 1122. Base station 1108 may also communicate with base station 1118 over path 1124.

In various embodiments, the paths 1122 and 1124 represent different virtual local area networks (VLANs). In this example, both VLANs comprise the same nodes. The direction of data transmission, however, is different between the VLANs. For example, data may be transmitted from the base station 1108 over path 1122, to base station 1110, base station 1112, base station 1114, base station 1116, and then to base station 1118. Alternately, data may be transmitted from the base station 1108 over path 1124, to base station 1118, base station 1116, base station 1114, base station 1112, and then to base station 1110. Those skilled in the art will appreciate that may be directed to any base station without being transmitted to other base stations "down stream" along the path 1122 or 1124.

The network of base stations 1108-1118 may include nodes of two or more different VLANs. Each different VLAN may include similar nodes and/or the same nodes. For example, the first VLAN, identified as path 1122, may traverse the ring topology in a clockwise direction (e.g., from base station 1108 to base station 1110 and so on). The second VLAN, identified as path 1124, may traverse the ring topology in a counter-clockwise direction (e.g., from base station 1108 to base station 1118 and so on). Those skilled in the art will appreciate that there may be any number of VLANs that include all or some of the base stations 1108-1118.

In order to determine which path to provide data, each base station 1108-1118 of the ring network may comprise routing data. Routing data may comprise routing criteria, path identifiers, and rules. The routing criteria may be any criteria which may be used to determine which path of the plurality of paths identified by the routing data is preferable (e.g., which path to provide data to one or more other base stations). Path identifiers comprise identifiers which identify one or more possible paths over which to provide data to other base stations. In one example, a path identifier may comprise a VLAN identifier. A rule may be any instruction which may be used to weigh routing information (e.g., state of congestion, link failure, and/or available capacity of a node), determine an overall state of the path, or instructions to select the preferred path based on the criteria in order to determine a path over which to provide data.

For example, the base station 1108 may receive data via the ASN gateway 1106 (e.g., data from the communication network 1102) and may subsequently select which VLAN over which to transmit data to the destination node. After determining the destination node for the data received from the ASN gateway 1106, the base station 1108 may retrieve the routing data from storage and select a VLAN from a VLAN table of path identifiers based on routing criteria.

The selection of the VLAN may be based on any number of factors including, but not limited to, proximity of the destination base station along the path of different VLANs, congestion of any base stations along VLAN paths, failure of one or more base stations, and/or prior transmissions provided over one or both VLANs over a predetermined period of time (e.g., available capacity for one or more base stations).

In some embodiments where a path is a VLAN, each base station 1110-1118 may receive data from one or more other base stations and may individually select a VLAN from routing information over which to provide data to the destination base station. For example, base station 1110 may receive data from base station 1108 via path 1112 (where path 1112 is along a first VLAN). The base station 1110 may determine the destination base station (e.g., base station 1116), retrieve routing information, and select a VLAN. The available VLANs identified in the routing information of base station 1110 may be the same or different than the VLANs identified in the routing information of base station 1108. The base station 1110 may select a VLAN based on any number of factors, including, for example, the VLAN selected by the previously transmitting base station (e.g., base station 1108), the proximity of the destination base station along the path of the VLANs, congestion of any base stations along VLAN paths, failure of base stations, and/or prior transmissions provided over one or both VLANs over a short period of time.

In one example, base station 1108 may receive data to be directed to base station 1116. The base station 1108 may select the first VLAN along path 1122 and direct the data to the base station 1110. The base station 1110 may receive the data, determine the destination base station 1116, but select the second VLAN based on congestion or the lack of capacity at base station 1114. As a result, the data may be directed back to base station 1108 along path 1124 to the destination base station 1115. The base station 1108 may subsequently provide the data along the second VLAN to base station 1118.

In some embodiments, rules within the routing data may require different weights to be given to different factors (e.g., criteria) in determining the available VLAN (e.g., available path) over which to provide the data. For example, the VLAN determination of the previous base station may be given significant weight that may only be overcome by other highly weighted criteria or criterion. For example, base station 1110 may change the VLAN from the VLAN originally selected by base station 1108 (e.g., the previously transmitting base station 1108) if congestion is very high or if there is a failure of transmission along the previously selected VLAN.

In some embodiments, the rules may require that weights change based on time. For example, if a duration of time between the initial detection of congestion and the receiving of data from the transmitting base station 1108 is less than a predetermined threshold, then the base station 1110 may place more weight on the congestion (e.g., newly detected congestion may be weighted more heavily than the previous path determination). If the congestion condition is relatively new, the previously transmitting base station 1108 may have selected the first VLAN without taking the new congestion into account. As such, subsequent base stations along the path may determine to use a different VLAN to provide the data if the congestion along the previously selected VLAN is too high.

In order to avoid an infinite loop, any precaution may be made. In some embodiments, there may be a rule that requires if data has been redirected through the same node more than a predetermined number of times (e.g., three times), then the previously selected path may not be changed. For example, each base station may track the number of times the same data has been routed through the base station. In some embodiments, the base station may add metadata, new data, or slightly alter the routed data (e.g., by altering a header) to indicate the number of times the path has been altered. Once another base station along the path receives the data, the base station may determine if the data has been redirected over the threshold (e.g., by review of the metadata, detection of the new data, or examination of the routed data) to determine if a path may be changed. Those skilled in the art will appreciate that any rule and/or criteria may be used to avoid an infinite loop of data redirection including, but not limited to, an expiration of a predetermined amount of time.

Figure 12:
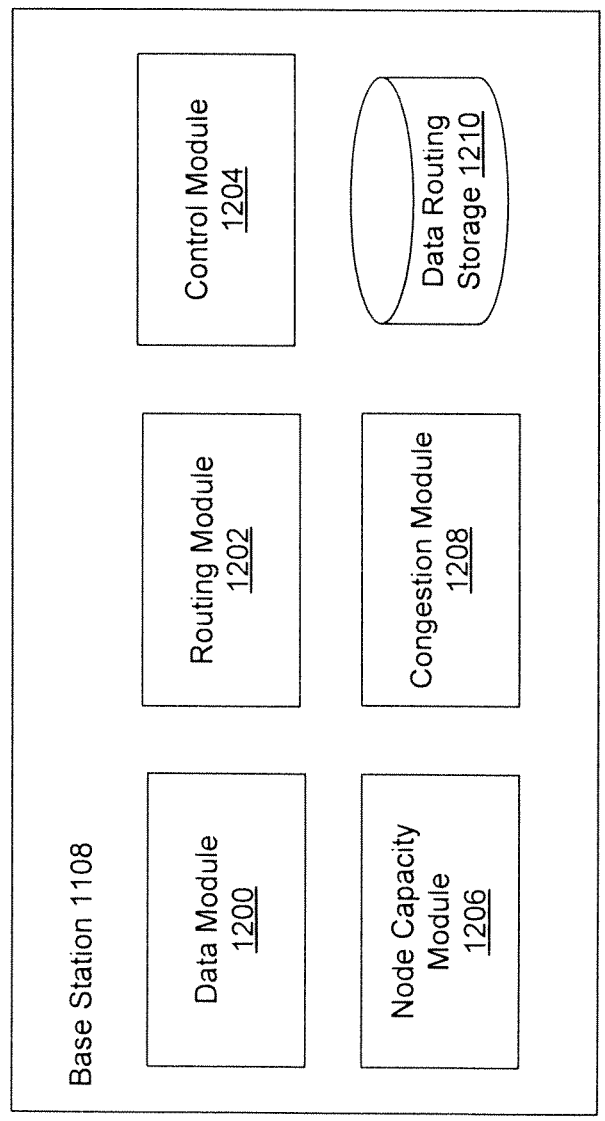
FIG. 12 is a block diagram of an exemplary base station.

FIG. 12 is a block diagram of an exemplary base station 1108. Base station 1108 may comprise a data module 1200, a routing module 1202, a control module 1204, a node capacity module 1206, a congestion module 1208, and a data routing storage 1210. The data module 1200 may be configured to receive data from and/or transmit data to another base station.

In one example, the data module 1200 of the base station 1108 may receive data from the ASN gateway 1106. The data module 1200 may be further configured to identify the destination of the data. For example, the data module 1200 may determine that the data from the ASN gateway 1106 is directed to base station 1114 based on inspection of the data (e.g., inspection of a data packet and/or metadata associated with the received data).

In one example, the data module 1200 may receive metadata associated with the received data which may identify the destination. The metadata may be contained within the received data or provided separately from the data (e.g., from a data transmitting device such as the original source of the data, a router, or ASN gateway 1106).

The routing module 1210 may be configured to select a path and route data to another base station over the selected path. For example, the routing module 1210 may be configured to determine which VLAN of a plurality of VLANs to provide the data. In some embodiments, the routing module 1210 retrieves routing information, including a VLAN table, from data routing storage 1210. The VLAN table may identify a first VLAN and a second VLAN (i.e., a plurality of path identifiers). The first VLAN may be used to deliver data in a clockwise direction along path 1122. For example, data may be transmitted along the first VLAN from base station 1108, to base station 1110, then to base stations 1112 and 1114, respectively, and ultimately to base station 1116 (i.e., the destination base station which may provide the information to the subscriber station 1120). The second VLAN may be used to deliver data in a counter-clockwise direction along path 1124. For example, data may be transmitted along the second VLAN from base station 1108, to base station 1118, then to base stations 1116.

In some embodiments, the routing module 1210 may select one of the plurality of VLANs from the VLAN table based on transmission factors (i.e., one or more routing criteria). Transmission factors may include any factors (i.e., conditions or status) that may affect transmission or the quality of transmission (e.g., speed or lack of errors). For example, if there is traffic congestion (e.g., too much traffic or fading conditions) between base station 1110 and 1112, the routing module 1210 may select the second VLAN to route traffic to base stations 1118, 1116, 1114, and 1112. In another example, if all or almost all of the capacity of a base station is being utilized, the router module 1210 may direct traffic along another VLAN away from the underperforming base station. For example, if the base station 1118 is close to capacity (e.g., the base station 1118 has already received previous data transmission such that the base station 1118 has reached or almost reached capacity) then the base station 1108 may direct traffic along the first VLAN to route traffic to base stations 1110, 1112, 1114, and 1116. Those skilled in the art will appreciate that there may be any number of routing criteria. Further, those skilled in the art will appreciate that there may be multiple factors (e.g., congestion and capacity) affecting one or more base stations simultaneously.

The routing module 1202, based at least in part on the routing criteria and rules, may determine a state of a path. The state of the path may be an amount of congestion of the path (e.g., between any two base stations), the available capacity of various base stations along the path, failure of a link between paths, and the like. The routing module 1202 may determine the state of the path through determination of congestion, capacity, and/or failure. All or a part of the state of the path may be compared to one or more predetermined thresholds. For example, if the congestion along a path is greater than a predetermined congestion threshold, the routing module 1202 may determine to use an alternate path.

Those skilled in the art will appreciate that the routing module 1202 may not evaluate all available paths. For example, if the data is received from a previous base station and the previous base station selected the first VLAN, the routing module of the receiving base station may evaluate the state of the first VLAN. If the state of the first VLAN is satisfactory (e.g., congestion, capacity, and/or failure are at or below a predetermined threshold), then the receiving base station may provide the data along the first VLAN without evaluating other options. If the VLAN is not satisfactory, the routing module 1202 may evaluate each available path until a satisfactory path is found and provide the data along the satisfactory path.

The routing module 1202 may, in some embodiments, evaluate all or a plurality of available VLANs. Those skilled in the art will appreciate that the routing module 1202 may evaluate all available VLANs because all available VLANs are determined to fall below one or more predetermined thresholds and/or are otherwise unsatisfactory. In some embodiments, the routing module 1202 may evaluate all available paths and compare the states and/or criteria associated with each path to one or more other states and/or criteria of other paths to find the most optimal or the most satisfactory path. In one example, the routing module 1202 may compare one or more criteria associated with different paths (e.g., congestion of multiple paths) to determine the most efficient path. In another example, the routing module 1202 may compare overall states (e.g., the routing module 1202 may weight various criteria including congestion, capacity, and/or failure to determine an overall value) of two or more paths based on two or more different criteria to determine the most efficient paths. Those skilled in the art will appreciate that there may be many different ways to compare two or more different paths.

The routing module 1202 may comprise a transmitting module configured to route data to one or more other base stations, subscriber stations and/or ASN gateways 1106. The transmitting module may comprise an antenna, hardware, and or software for preparing the data for transmission. In various embodiments, the transmitting module is separate from the routing module 1202.

The control module 1204 is configured to determine the available capacity and congestion (if any) of the base station 1108. In various embodiments, the control module 1204 is configured to identify the capacity of the base station 1108. Those skilled in the art will appreciate that each node may have different capacity and/or different available capacity in different directions along the ring network (e.g., 1 gigabyte per second along path 1122 and 1 gigabyte per second along path 1124). The control module 1204 may measure the available capacity of the base station 1108 based on transmission from and data received by the base station 1108 over a predetermined period of time, available buffer for received data, and/or available buffer for data to transmit. The control module 1204 may update the available capacity and provide the available capacity of the base station 1108 to one or more other base stations 1110-1118 and/or the ASN gateway 1106.

The control module 1204 may also determine congestion along paths 1122 and/or 1124 about the base station 1108. Congestion may be a measure that may indicate the speed or quality of transmission between two or more base stations. In one example, the control module 1204 may provide data and/or status checks to base stations 1110 and 1118. Based on the information received from the base station 1110 and/or the base station 1118 as well as based on the speed of return transmission to the base station 1108, the control module 1204 may determine congestion. For example, the base station 1110 may have previously determined current congestion and may provide the information to the base station 1108 in response to the status check provided by the base station 1108. In another example, the speed of the response to the base station 1108 may indicate possible congestion (e.g., if the response indicated a significant lag in communication between the base stations). Similarly, the control module 1204 may detect failure of links between base stations by receiving congestion updates, failure to receive information from another base station, errors in data received from other base stations, and/or lag time in receiving data.

The node capacity module 1206 may be configured to receive and track the capacity of one or more base stations or other nodes within a network. For example, the node capacity module 1206 may receive and/or track the capacity of one or more base stations 1108-1118. In various embodiments, each base station 1108-1118 comprises a node capacity module 1206 that is configured to retrieve (e.g., from the data routing storage 1210) previously stored capacity values (i.e., values that indicate overall capacity in one or more different directions of a node) of the different base stations.

The node capacity module 1206 may determine available capacity of one or more of the base stations in any number of ways. For example, the node capacity module 1206 may receive available capacity status messages from the node capacity module of another base station. The node capacity module 1206 may track and update the available capacity of the different base stations based on requesting available capacity of different nodes through transmitting capacity status request messages.

In various embodiments, the node capacity module 1206 may store available capacity for one or more base stations (e.g., within the data routing storage 1210). The node capacity module 1206 may also associate available capacity with a time such that the available capacity may be timestamped to allow the routing module 1202 the ability to weigh capacity differently based on the age of the information.

The congestion module 1208 may determine the congestion associated with the base station 1108 (e.g., along paths 1122 and 1124). In one example, the congestion module 1208 may be configured to retrieve congestion status associated with one or more other base stations from the data routing storage 1210. The congestion module 1208 may track data that was transmitted to the other base station from the base station 1108 and/or determine congestion of the other base station based on recent transmissions and received responses.

The congestion module 1208 may be configured to receive and track congestion of one or more base stations or other nodes within a network. For example, the congestion module 1208 may receive and/or track the congestion associated with one or more base stations 1108-1118.

The congestion module 1208 may determine congestion of one or more of the base stations in any number of ways. For example, the congestion module 1208 may receive congestion status messages from the congestion module of another base station. The congestion module 1208 may track and update the congestion of the different base stations based on the congestion status messages. As such, each base station may be configured to estimate current congestion conditions of one or more other (if not all) base stations.

In various embodiments, the congestion module 1208 may determine the available capacity of one or more base stations by tracking data transmission to and/or from a base station. In one example, the congestion module 1208 may track data that was transmitted to the other base station from the base station 1108 and determine congestion status and/or capacity of the other base station based on recent transmissions.

In various embodiments, the congestion module 1208 may store congestion information for one or more base stations (e.g., within the data routing storage 1210). The node congestion module 1208 may also associate congestion information with a time such that the available capacity may be timestamped to allow the routing module 1202 the ability to weigh congestion differently based on the age of the information.

Data routing storage 1210 is any storage (e.g., computer readable media) which may store routing data such as one or more path identifiers (e.g., path or VLAN tables), criteria, and rules as well as congestion states, failure states, transmission histories, and base station capacities. Although FIG. 12 depicts a single data routing storage 1210, those skilled in the art will appreciate that there may be any number of data routing storages 1210.

Although VLAN and path tables are discussed herein, those skilled in the art will appreciate that any data structure may be used to store path identifiers, criteria, values associated with past states, and the like. Further, any number of different data structures may be used.

As discussed herein, alternative embodiments may comprise more, less, or functionally equivalent modules and still be within the scope of present embodiments. For example, as previously discussed, the functions of the various modules may be combined or divided differently.

Figure 13:
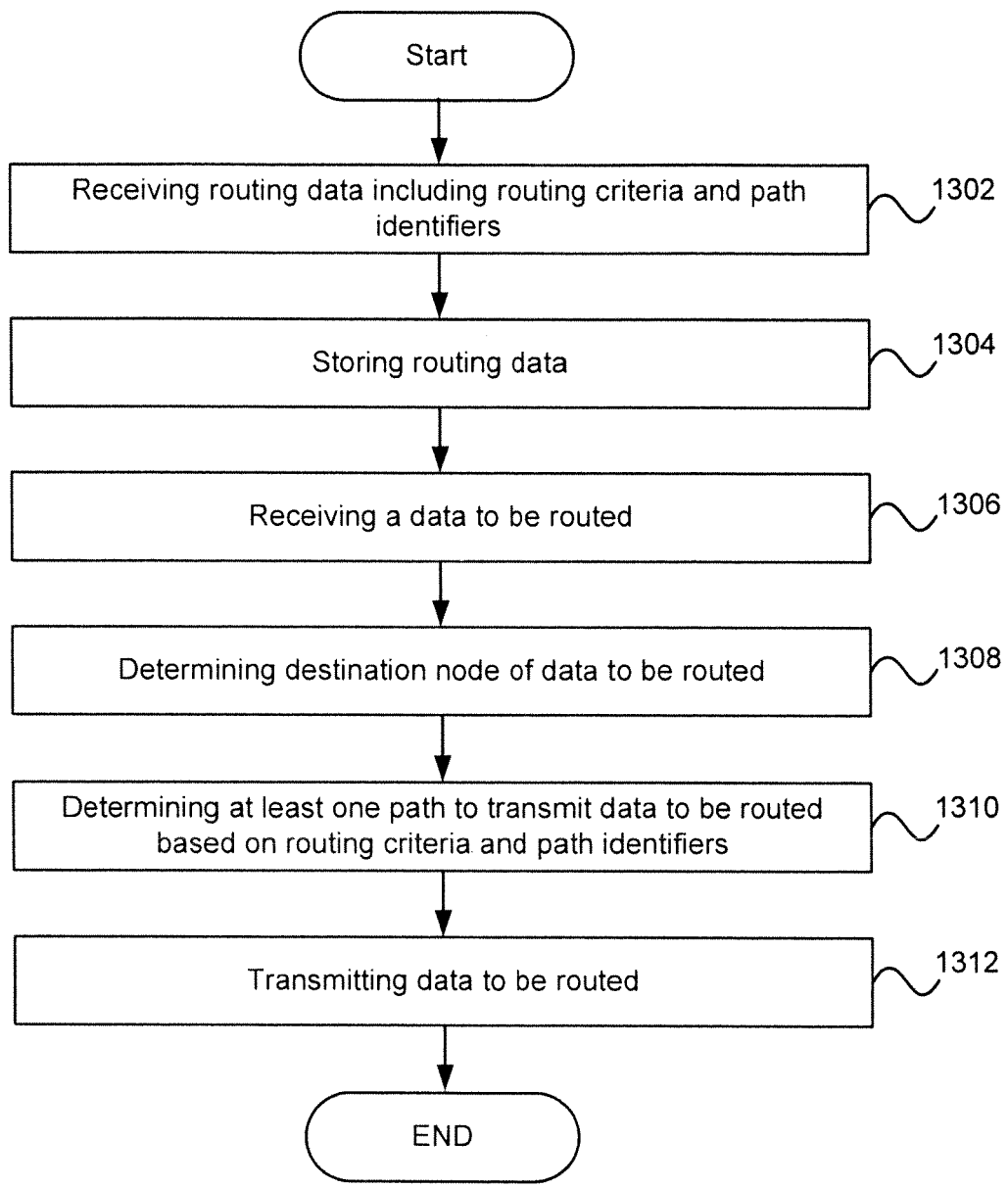
FIG. 13 is a flow diagram of an exemplary method for routing data in some embodiments.

FIG. 13 is a flow diagram of an exemplary method for routing data in some embodiments. In step 1302, the routing module 1202 receives routing data including path identifiers and routing criteria. In some embodiments, routing data may describe a plurality of VLAN identifiers or spanning network identifiers. For example, path identifiers may identify different VLANs, respectively. The routing module 1202 may receive the routing data from a routing element (e.g., another base station, node of the network, ASN gateway 1106, or a routing server configured to provide routing data to one or more base stations).

The routing criteria may include criteria that may be used to determine the route (e.g., which VLAN) over which data is to be transmitted to another base station. For example, the routing criteria may provide different various weights for different values (e.g., a predetermined weight to give the initial routing choice of a previous base station, a predetermined weight associated with an amount of congestion, and/or a predetermined weight associated with capacity of a base station). Based on the routing criteria and rules of applying routing criteria to information associated with the network (e.g., congestion, failure, or available capacity), the routing module 1202 may determine which of the available VLANs to provide the data.

In step 1304, the routing module 1202 stores the routing data in the data routing storage 1210. Those skilled in the art will appreciate that routing criteria may be stored within each base station of a network of base stations. Further, the routing criteria for one base station may be different than the routing criteria of another. In some embodiments, the routing criteria may be stored in a subset of base stations (e.g., one base station) or other routing element. When needed, the base station may retrieve the routing information and/or criteria from another base station or routing element.

In step 1306, the data module 1200 receives data to be routed. In one example, the data to be routed is received from the ASN gateway 1106. The received data may comprise data packets. In step 1308, the data module 1200 determines the destination base station associated with the received data. In one example, the data module 1200 determines the destination base station based on one or more received data packets (e.g., by inspecting the header of the packet of data or otherwise retrieving the destination base station information).

In step 1310, the routing module 1202 determines at least one path (e.g., VLAN) over which to transmit the received data based on the previously stored routing information (e.g., routing criteria and path identifiers). In one example, once the destination base station of the packet of data is determined, the routing module 1202 may retrieve the routing information from the data routing storage 1210. The routing module 1202 may determine the available capacity of one or more base stations which may receive the data packet (e.g., the base stations in between the transmission base station and the destination base station) as well as congestion (if any) between two or more different base stations which may receive the data packet.

In some embodiments, the routing module 1202 determines failures or possible failures along the paths which may influence path selection. In one example, the routing module 1202 may transmit failure status messages and/or congestion status messages to determine if paths are active and free of failure. Those skilled in the art will appreciate that one or more base stations may check for failures (e.g., at predetermined intervals) and, if a failed path or congestion is detected, then the information may be shared by one or more of the base stations. The failed path (e.g., between base stations 1110 and 1112) and/or congestion may be rechecked at predetermined intervals. If the failed path begins to function again, one or more base stations may detect the change and share the information.

In various embodiments, the routing module 1202 determines which path to provide the received data based on the available capacity and possible congestion associated with any number of base stations and/or paths. The routing module 1202 may also take into account any failed paths. In one example, the routing module 1202 retrieves the available information (e.g., from one or more base stations and/or the data routing storage 1210) and weighs the different criterion to determine which path to provide the packet of data.

In some embodiments, the routing module 1202 may apply various rules to calculate the preferred path. For example, congestion values below a predetermined threshold may be lightly weighted (or not taken into account at all) while congestion values above the predetermined threshold may be weighted more significantly. Further, if available capacity of a base station is low, this factor may be weighted more heavily than congestion between two base stations. Once the information regarding one or more available paths is collected and weighed, the routing module 1202 may select the preferred path by comparing the weighted information to one or more thresholds. The routing module 1202 may also select the preferred path by comparing the weighted information of multiple paths to each other.

In step 1312, the routing module 1202 may transmit data over the determined path.

In various embodiments, the routing module 1202 may also track performance of paths and/or base stations along paths. For example, the routing module 1202 may transmit and provide performance messages to one or more base stations to determine performance based on the data to be routed and/or any other data to be received or transmitted. The routing module 1202 may receive responses including performance values from the base stations and/or may generate performance values by testing the performance of paths, links, and base stations directly. The performance values may be compared against metrics (e.g., predetermined performance thresholds) to track or determine paths with unsatisfactory performance (e.g., lag, errors caused by fading, or an unknown condition). The performance values may also be used to track or determine satisfactory paths (e.g., for quality of service). In various embodiments, the routing module 1202 may compare the performance of different paths to each other to assist in the determination of the path to route data.

Figure 14:
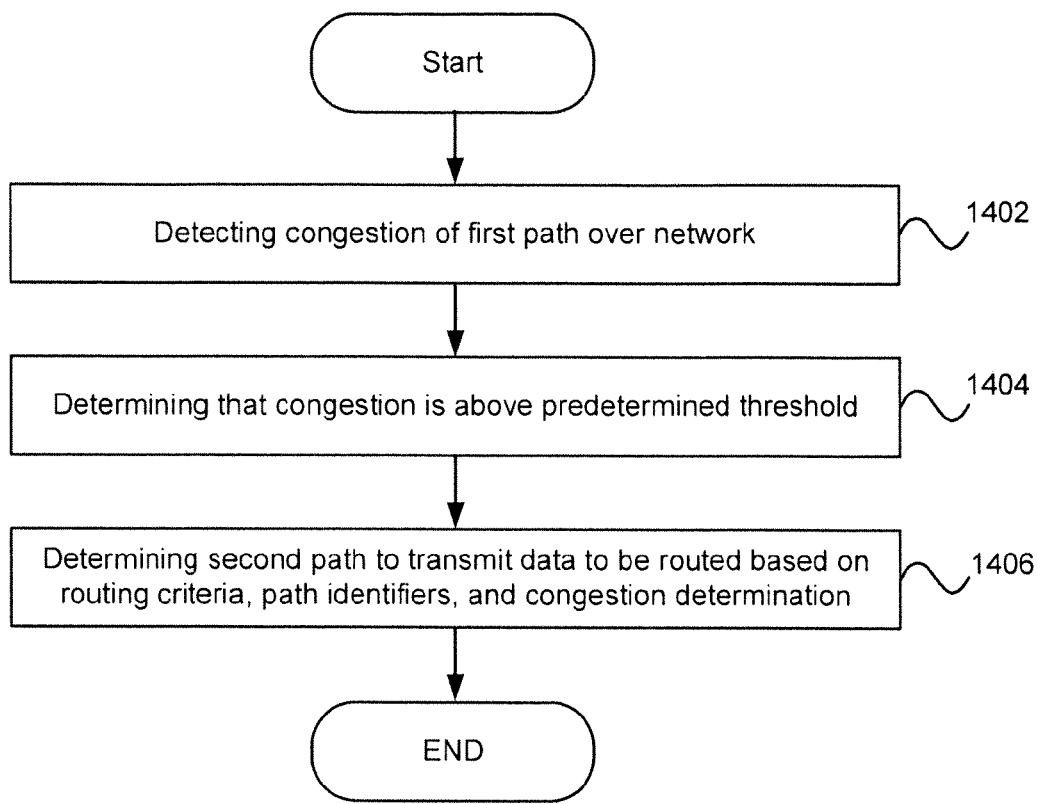
FIG. 14 is a flow diagram of an exemplary method for routing based on detected congestion in some embodiments.

FIG. 14 is a flow diagram of an exemplary method for routing based on detected congestion in some embodiments. In step 1402, the routing module 1202 determines congestion of a first path over a network. In some embodiments, the routing module 1202 may determine different paths to provide data to the destination base station. In step 1404, the congestion along each path may be determined and compared to a predetermined threshold and/or each other.

The base station 1108 may determine that the destination base node is base station 1110. The first VLAN along path 1122 may allow for data to be provided directly from the base station 1108 and the base station 1110. The second VLAN along path 1124 may require the data to be provided through four other base stations before being received by the base station 1110. Although there may be a strong bias to provide the data along the shortest path (e.g., a rule may indicate that there is a bias against providing data along longer paths), high congestion, lack of capacity of the base station 1110, and/or path failure may influence the base station 1108 to provide the data along the second VLAN (e.g., which may provide a faster path for transmission than the first VLAN).

In various embodiments, the routing module 1202 weighs congestion along the first path as well as the congestion along the second path to assist in determining path selection. The routing module 1202 may compare a measure of congestion between any two base stations before taking the congestion into account or, alternately, waiting the congestion less, for purposes of determining the path in step 1406.

After determining the location of the destination base station 1110, the base station 1108 may determine possible congestion, status of path failure(s), and available capacity of the base station(s) along the shortest path. For example, the routing module 1202 may determine that there is significant congestion between base station 1108 and 1110 along path 1122. Any congestion between the transmitting base station(s) and the destination base station may be taken into account. The congestion (e.g., combined congestion between multiple base stations) may be compared to a predetermined threshold to determine the significance of the congestion. In some embodiments, if the congestion is above the predetermined threshold, the routing module 1202 may determine the congestion along the second path. If congestion along the second path is also greater than the predetermined threshold and/or greater than the congestion along the first path, then the routing module 1202 may direct the data along the first path. If congestion is below the predetermined threshold, then the routing module 1202 may not determined congestion long the second path.

In various embodiments, each base station may track congestion. For example, base station 1110 may track congestion between base station 1112 and 1110 as well as congestion between base stations 1108 and 1110. The base station 1110 may track the congestion by measuring transmitted data to and from the base station 1110, tracking communications between base station 1110 and the base stations 1108 and 1112, and/or providing congestion check messages to the base stations 1108 and 1112. The base station 1110 may determine the congestion status in and around the base station 1110 and provide congestion status messages to one or more other base stations indicating the congestion status. Similarly, other base stations may also determine their local congestion status and provide the information to the other base stations.

Those skilled in the art will appreciate that the determination of the congestion status of various paths between base stations may be determined by any base station. For example, the base station 1110 may determine the congestion status between base stations 1114 and 1116.

In step 1406, the base station 1110 determines a second path to transmit data to be routed based on the routing criteria, path identifiers, and congestion determination. For example, the base station 1110 may retrieve a path table which comprises path identifiers for the first and second paths as well as routing criteria. The base station 1110 may weigh the congestion in the overall determination of the path. In various embodiments, the base station 1110 individually weighs congestions between base stations and/or may weigh congestion between three or more base stations along one or both paths. The weights may be based on the routing criteria and/or rules. Subsequently, the base station 1110 may route the data along the determined path.

Figure 15:
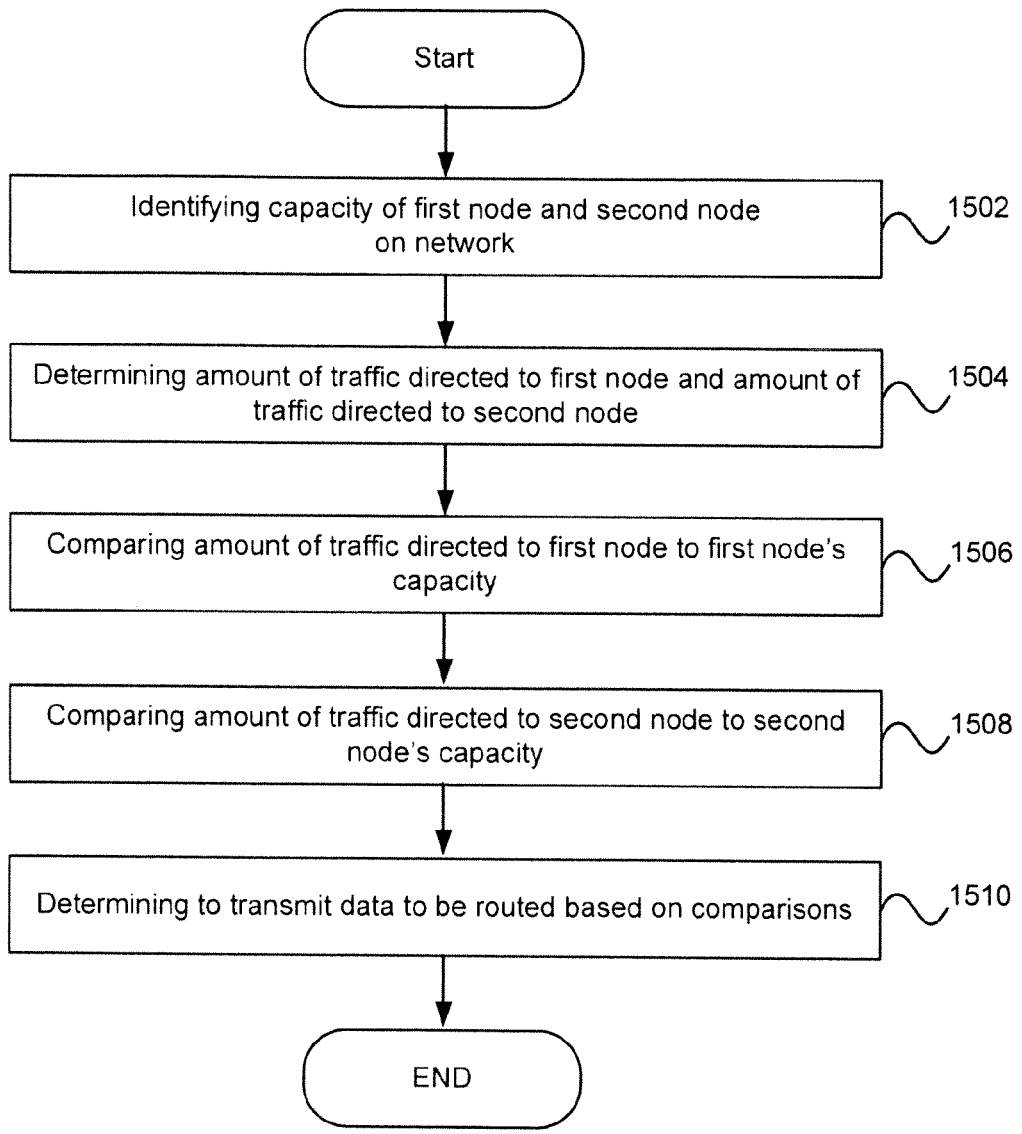
FIG. 15 is a flow diagram of an exemplary method of routing based on node capacity in some embodiments.

FIG. 15 is a flow diagram of an exemplary method of routing based on node capacity in some embodiments. In step 1502, the base station 1108 may identify a capacity of base station 1110 and base station 1118 of a network. In various embodiments, the base station 1108 may be configured by a user (e.g., via the ASN gateway 1106) or may retrieve the capacity of the various base stations from the base stations themselves. In one example, the capacity of base station 1110 may indicate that the base station 1110 may send and receive up to one gigabyte per second along path 1122 and up to one gigabyte per second along path 1124.

In some embodiments, a base station may have a first capacity to send and receive along a first path and may have a second capacity to send and receive along a second path. The capacity along different paths may be different. For example, the base station 1110 may have capacity to send and receive data to base station 1108 and have capacity to send and receive data to base station 1112. Even if the base station 1110 has reached capacity (i.e., there is no available capacity) receiving data from base station 1108 along the first path, the base station 1110 may have available capacity along the second path. As such, different available capacities of a base station into account when determining the path to route data.

In step 1504, the base station 1108 may determine an amount of traffic directed to a first node (e.g., base station 1112) and an amount of traffic directed to a second node (e.g., base station 1116). In various embodiments, the base station 1108 determines an amount of traffic directed to the base station 1112 by tracking the data provided from the base station 1108 to the base station 1112 (e.g., either data directed by the base station 1108 to the base station 1112 for relay to another base station and/or data directed to the base station 1112 as a destination). In various embodiments, the different base stations may communicate capacity to other base stations. Capacity status indicates the availability of capacity or the lack of available capacity of the base station providing the capacity status (e.g., the available capacity of the base station associated with different paths).

In step 1506, the base station 1108 compares an amount of traffic directed to the first node to the first node's capacity to determine the first node's available capacity. For example, the base station 1108 may determine traffic (e.g., traffic from the ASN gateway 1106 and/or other base stations) directed to the first node (e.g., the first node is the destination base station or the first node is to relay data to the destination base station).

Similarly, in step 1508, the base station 1108 compares an amount of traffic directed to the second node to the second node's capacity to determine the second node's available capacity. For example, the base station 1108 may determine traffic (e.g., traffic from the ASN gateway 1106 and/or other base stations) directed to the first node (e.g., the second node is the destination base station or the second node is to relay data to the destination base station). The base station 1108 may determine which path is associated with the traffic.

In some embodiments, step 1508 is optional. For example, if the first node's available capacity is determined to be sufficient (e.g., the first node's available capacity is greater than a predetermined threshold), the base station 1510 may determine to transmit data to be routed to over the path of the first node.

Those skilled in the art will appreciate that the first and second node may be the same base station. For example, the available capacity of the first node may represent the available capacity of a base station along a first path. The available capacity of the second node may represent the available capacity of a base station along a second path.

In step 1510, the base station 1108 determines to transmit data to be routed based on the comparisons of steps 1506 and 1508. For example, the base station 1108 may receive data to be routed along one of the paths over the first or second node. The base station 1108 may compare the first node's capacity to a predetermined threshold. If the available capacity is below the predetermined threshold, the base station 1108 may provide data to be routed along a path that provides the data over the first node. If the available capacity of the first node is less than the predetermined threshold, the base station 1108 may compare the available capacity of the second node to the predetermined threshold. If the second node's available capacity is greater than the predetermined threshold, then the base station 1108 may provide the data to be routed over the second node's capacity. In various embodiments, the base station 1108 may compare the available capacity of the first node to the available capacity of the second node to select the preferred path.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

The invention claimed is:

1. A method comprising:
receiving routing information by a routing element of a point to point wireless network, the routing information comprising a plurality of Virtual Local Area Network (VLAN) identifiers which identify a plurality of Virtual Local Area Networks (VLANs) through the point to point wireless network and a set of rules for determining a preferred path through the point to point wireless network;
receiving a packet of data;
identifying a destination node for the packet of data;
identifying a first VLAN and a second VLAN of the plurality of VLANs that the routing element may use to route the packet of data to the destination node;
receiving a first performance value characterizing performance of the first VLAN at a first time;
applying, according to at least one rule of the set of rules, a weight to the first performance value based on an elapsed time between the first time and a time at which the packet of data is received, yielding a first weighted performance value;
selecting, based on the first weighted performance value, the first VLAN or the second VLAN as a preferred path to transmit the packet of data to reach the destination node; and
transmitting, based on the selection, the packet of data to the destination node via the preferred path.

2. The method of claim 1, wherein the set of rules comprises a rule to select the second VLAN as the preferred path if the first VLAN is determined to be not functional.

3. The method of claim 1, wherein the set of rules comprises a rule to select the second VLAN as the preferred path if the first VLAN is determined to be congested.

4. The method of claim 3, further comprising determining, by the routing element, congestion of the first VLAN by tracking network traffic transmitted from the routing element to one or more nodes of the first VLAN.

5. The method of claim 4, wherein the set of rules comprises a rule to transmit the packet of data over the second VLAN when congestion of the first VLAN exceeds a predetermined limit.

6. The method of claim 1, wherein the first performance value characterizes a capacity of the destination node associated with the first VLAN.

7. The method of claim 6, wherein the set of rules comprises a rule to select the second VLAN as the preferred path upon a determination that an amount of traffic transmitted via the first VLAN meets or exceeds a predetermined percentage of the capacity.

8. The method of claim 1, wherein the selecting is further based on a time of day when the first VLAN may be congested.

9. The method of claim 1, wherein the first VLAN is selected as the preferred path to transmit the packet of data when the first weighted performance value is greater than a second performance value associated with the second VLAN.

10. The method of claim 1, wherein the point to point wireless network comprises a Multiprotocol Label Switching (MPLS) network.

11. The method of claim 1, wherein the point to point wireless network comprises a microwave network.

12. The method of claim 1, wherein the point to point wireless network comprises a backhaul for a cellular communication network.

13. The method of claim 1, wherein the point to point wireless network comprises a Worldwide Interoperability for Microwave Access (WiMax) network.

14. The method of claim 1, further comprising storing the routing information by the routing element.

15. A routing element comprising:
a network interface configured to:
receive routing information of a point to point wireless network, the routing information comprising a plurality of Virtual Local Area Network (VLAN) identifiers which identify a plurality of Virtual Local Area Networks (VLANs) through the point to point wireless network and a set of rules for determining a preferred path through the point to point wireless network, and
receive a packet of data;
a data module configured to:
identify a destination node for the packet of data,
identify a first VLAN and a second VLAN of the plurality of VLANs that the routing element may use to route the packet of data to the destination node, and
receive a first performance value characterizing performance of the first VLAN at a first time; and a routing module configured to:
apply, according to at least one rule of the set of rules, a weight to the first performance value based on an elapsed time between the first time and a time at which the packet of data is received, yielding a first weighted performance value, and
select, based on the first weighted performance value, the first VLAN or the second VLAN as a preferred path to transmit the packet of data to reach the destination node; and
a transmission module configured to transmit, based on the selection, the packet of data to the destination node via the preferred path.

16. The routing element of claim 15, wherein the set of rules comprises a rule to select the second VLAN as the preferred path if the first VLAN is determined to be not functional.

17. The routing element of claim 15, wherein the set of rules comprises a rule to select the second VLAN as the preferred path if the first VLAN is determined to be congested.

18. The routing element of claim 17, further comprising a congestion module configured to determine congestion of the first VLAN by tracking network traffic transmitted from the routing element to one or more nodes of the first VLAN.

19. The routing element of claim 18, wherein the set of rules comprises a rule to select the second VLAN as the preferred path when congestion of the first VLAN exceeds a predetermined limit.

20. The routing element of claim 15, wherein the first performance value characterizes a capacity of the destination node associated with the first VLAN.

21. The routing element of claim 20, wherein the routing module selects the second VLAN as the preferred path when an amount of traffic transmitted via the first VLAN meets or exceeds a predetermined percentage of the capacity.

22. The routing element of claim 15, wherein the routing module selects the first VLAN or the second VLAN as the preferred path further based on a time of day when the first VLAN may be congested.

23. The routing element of claim 15, wherein the first VLAN is selected as the preferred path to transmit the packet of data when the first weighted performance value of the first VLAN is greater than a second performance value associated with the second VLAN.

24. The routing element of claim 15, wherein the point to point wireless network comprises a Multiprotocol Label Switching (MPLS) network.

25. The routing element of claim 15, wherein the point to point wireless network comprises a microwave network.

26. The routing element of claim 15, wherein the point to point wireless network comprises a backhaul for a cellular communication network.

27. The routing element of claim 15, wherein the point to point wireless network comprises a Worldwide Interoperability for Microwave Access (WiMax) network.

28. The routing element of claim 15, further comprising storage configured to store the routing data.

29. A non-transitory computer readable medium comprising instructions executable by a processor to perform a method, the method comprising:
receiving routing information by a routing element of a point to point wireless network, the routing information comprising a plurality of Virtual Local Area Network (VLAN) identifiers which identify a plurality of Virtual Local Area Networks (VLANs) through the point to point wireless network and a set of rules for determining a preferred path through the point to point wireless network;
receiving a packet of data;
identifying a destination node for the packet of data;
identifying a first VLAN and a second VLAN of the plurality of VLANs that the routing element may use to route the packet of data to the destination node;
receiving a first performance value characterizing performance of the first VLAN at a first time;
applying, according to at least one rule of the set of rules, a weight to the first performance value based on an elapsed time between the first time and a time at which the packet of data is received, yielding a first weighted performance value;
selecting, based on the first weighted performance value, the first VLAN or the second VLAN as a preferred path to transmit the packet of data to reach the destination node; and
transmitting, based on the selection, the packet of data to the destination node via the preferred path.

* * * * *